US012803635B2

(12) United States Patent
Grossmann et al.

(10) Patent No.: US 12,803,635 B2
(45) Date of Patent: Nov. 17, 2026

(54) METHODS AND APPARATUSES FOR CSI REPORTING FOR JOINT TRANSMISSION IN A WIRELESS COMMUNICATIONS NETWORK

(71) Applicant: Fraunhofer-Gesellschaft zur Förderung der angewandten Forschung e.V., Munich (DE)

(72) Inventors: Marcus Grossmann, Erlangen (DE); Venkatesh Ramireddy, Erlangen (DE); Markus Landmann, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 13 days.

(21) Appl. No.: 18/579,416

(22) PCT Filed: Jun. 21, 2022

(86) PCT No.: PCT/EP2022/066821
§ 371 (c)(1),
(2) Date: Jan. 15, 2024

(87) PCT Pub. No.: WO2023/285079
PCT Pub. Date: Jan. 19, 2023

(65) Prior Publication Data

US 2024/0340052 A1 Oct. 10, 2024

(30) Foreign Application Priority Data

Jul. 14, 2021 (EP) .................................... 21185495

(51) Int. Cl.
*H04B 7/06* (2006.01)
*H04B 7/0456* (2017.01)

(52) U.S. Cl.
CPC ......... *H04B 7/0626* (2013.01); *H04B 7/0478* (2013.01); *H04B 7/0639* (2013.01)

(58) Field of Classification Search
CPC ... H04L 5/0053; H04L 27/261; H04B 7/0626; H04B 7/024; H04B 7/0456; H04B 7/066; H04B 7/0639; H04B 7/0478
See application file for complete search history.

(56) References Cited

U.S. PATENT DOCUMENTS

2020/0328862 A1* 10/2020 Rahman ................ H04L 5/0044
2023/0009991 A1* 1/2023 Liu ...................... H04B 7/0626
(Continued)

FOREIGN PATENT DOCUMENTS

KR 10-2021-0025097 3/2021
WO WO2020/248247 A1 12/2020
WO WO2021/044190 A1 3/2021

OTHER PUBLICATIONS

International Search Report, Oct. 5, 2022, International Search Authority, European Patent Office, International Application No. PCT/EP2022/066821.
(Continued)

*Primary Examiner* — Aristocratis Fotakis
(74) *Attorney, Agent, or Firm* — Burr & Forman LLP; Nathaniel T. Quirk, Esq.

(57) ABSTRACT

The embodiments of the present disclosure relate to methods and apparatuses for the generation and transmission/reception of a CSI report or CSI feedback report. The method performed by a UE includes: receiving from a network node a CSI report configuration indicating a number of antenna port groups or CSI-RS port groups; determining based on the CSI report configuration a precoder matrix for a number of antenna or CSI-RS port groups; generating, a CSI feedback report comprising a Precoder Matrix Indicator (PMI) indicating the precoder matrix for the number of antenna or
(Continued)

CSI-RS port groups; and reporting, to the network node, the CSI report or the CSI feedback report. The embodiments also relate to a method performed by a network node, a UE and a network node.

17 Claims, 9 Drawing Sheets

(56) References Cited

U.S. PATENT DOCUMENTS

| | | | | |
|---|---|---|---|---|
| 2023/0170963 | A1* | 6/2023 | Wu | H04W 72/23 370/329 |
| 2023/0261831 | A1* | 8/2023 | Hao | H04B 7/0626 370/329 |
| 2023/0291441 | A1* | 9/2023 | Muruganathan | H04B 7/0456 |
| 2024/0007164 | A1* | 1/2024 | Zhang | H04B 7/0481 |
| 2024/0098635 | A1* | 3/2024 | Zhang | H04B 7/0691 |

OTHER PUBLICATIONS

3GPP TSG RAN WG1 Meeting #97, ZTE, CSI Enhancement for MU-MIMO Support, R1-1906235.
Office Action, Mar. 23, 2026, Korean Patent Application No. 10-2024-7005083, Ministry of Intellectual Property.
3GPP TS 38.214 V16.6.0 (Jun. 2021), Technical Specification, 3rd Generation Partnership Project; Technical Specification Group Radio Access Network; NR; Physical Layer Procedures for Data (Release 16).

* cited by examiner

METHODS AND APPARATUSES FOR CSI REPORTING FOR JOINT TRANSMISSION IN A WIRELESS COMMUNICATIONS NETWORK

CROSS-REFERENCE TO RELATED APPLICATION

This application is a national stage application, filed under 35 U.S.C. § 371, of International Patent Application No. PCT/EP2022/066821 filed on Jun. 21, 2022, and European Patent Application No. 21185495.5 filed on Jul. 14, 2021, which are incorporated by reference herein in their entirety.

TECHNICAL FIELD

The present disclosure relates to the field of wireless communications, and in particular to methods and apparatuses for Channel State Information (CSI) feedback reporting for a codebook based precoding in a wireless communications network such as advanced 5G networks.

BACKGROUND

The fifth generation (5G) mobile communications system also known as new radio (NR) provides a higher level of performance than the previous generations of mobile communications system. 5G mobile communications has been driven by the need to provide ubiquitous connectivity for applications as diverse automotive communication, remote control with feedback, video downloads, as well as data applications for Internet-of-Things (IoT) devices, machine type communication (MTC) devices, etc. 5G wireless technology brings several main benefits, such as faster speed, shorter delays and increased connectivity. The third-generation partnership project (3GPP) provides the complete system specification for the 5G network architecture, which includes at least a radio access network (RAN), core transport networks (CN) and service capabilities.

FIG. 1 illustrates a simplified schematic view of an example of a wireless communications network 100 including a core network (CN) 110 and a radio access network (RAN) 120. The RAN 120 is shown including a plurality of network nodes or radio base stations, which in 5G are called gNBs. Three radio base stations are depicted gNB1, gNB2 and gNB3. Each gNB serves an area called a coverage area or a cell. FIG. 1 illustrates 3 cells 121, 122 and 123, each served by its own gNB, gNB1, gNB2 and gNB3, respectively. It should be mentioned that the network 100 may include any number of cells and gNBs. The radio base stations, or network nodes serve users within a cell. In 4G or LTE, a radio base station is called an eNB, in 3G or UMTS, a radio base station is called an eNodeB, and BS in other radio access technologies. A user or a user equipment (UE) may be a wireless or a mobile terminal device or a stationary communication device. A mobile terminal device or a UE may also be an IoT device, an MTC device, etc. IoT devices may include wireless sensors, software, actuators, and computer devices. They can be imbedded into mobile devices, motor vehicle, industrial equipment, environmental sensors, medical devices, aerial vehicles and more, as well as network connectivity that enables these devices to collect and exchange data across an existing network infrastructure.

Referring back to FIG. 1, each cell is shown including UEs and IoT devices. gNB1 in cell 121 serves UE1 121A, UE2 121B and IoT device 121C. Similarly, gNB2 in cell 121 serves UE3 122A, UE4 122B and IoT device 122C, and gNB3 in cell 123 serves UE5 123A, UE6 123B and IoT device 123C. The network 100 may include any number of UEs and IoT devices or any other types of devices. The devices communicate with the serving gNB(s) in the uplink and the gNB(s) communicate with the devices in the downlink. The respective base station gNB1 to gNB3 may be connected to the CN 120, e.g., via the S1 interface, via respective backhaul links 111, 121D, 122D, 123D, which are schematically depicted in FIG. 1 by the arrows pointing to "core". The core network 120 may be connected to one or more external networks, such as the Internet. The gNBs may be connected to each other via the S1 interface or the ×2 interface or the XN interface in 5G, via respective interface links 121E, 122E and 123E, which is depicted in the figure by the arrows pointing to gNBs.

For data transmission, a physical resource grid may be used. The physical resource grid may comprise a set of resource elements (REs) to which various physical channels and physical signals are mapped. For example, the physical channels may include the physical downlink, uplink and/or sidelink (SL) shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and/or sidelink control channels (PDCCH, PUCCH, PSCCH) carrying for example the downlink control information (DCI), the uplink control information (UCI) or the sidelink control information (SCI). For the uplink, the physical channels may further include the physical random-access channel (PRACH or RACH) used by UEs for accessing the network once a UE is synchronized and obtains the MIB and SIB. The physical signals may comprise reference signals (RS), synchronization signals (SSs) and the like. The resource grid may comprise a frame or radio frame having a certain duration, like 10 milliseconds, in the time domain and having a given bandwidth in the frequency domain. The radio frame may have a certain number of subframes of a predefined length, e.g., 2 subframes with a length of 1 millisecond. Each subframe may include two slots of a number of OFDM symbols depending on the cyclic prefix (CP) length. IN 5G, each slot consists of 14 OFDM symbols or 12 OFDM symbols based on normal CP and extended CP respectively. A frame may also consist of a smaller number of OFDM symbols, e.g., when utilizing shortened transmission time intervals (TTIs) or a mini-slot/non-slot-based frame structure comprising just a few OFDM symbols. Slot aggregation is supported in 5G NR and hence data transmission can be scheduled to span one or multiple slots. Slot format indication informs a UE whether an OFDM symbol is downlink, uplink or flexible.

The wireless communication network system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

The wireless communications network system depicted in FIG. 1 may be a heterogeneous network having two distinct overlaid networks, a network of macro cells with each macro cell including a macro base station, like base station gNB1 to gNB3, and a network of small cell base stations (not shown in FIG. 1), like femto- or pico-base stations. In addition to the above described wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, standard.

In the wireless communications network system such as the one depicted schematically in FIG. 1, multi-antenna techniques may be used, e.g., in accordance with LTE, NR or any other communication system, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct or focus a data transmission towards an intended receiver. The precoder matrix to be used at the gNB to map the data to the transmit antenna ports is decided using channel state information, CSI.

In the wireless communications network system as described above, such as LTE or New Radio (5G), downlink signals convey data signals, control signals containing downlink, DL, control information (DCI), and a number of reference signals or symbols (RS) used for different purposes. A gNodeB (or gNB or base station) transmits data and downlink control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of reference signals (RSs) including a common RS (CRS) in LTE, a channel state information RS (CSI-RS), a demodulation RS (DM-RS), and a phase tracking RS (PT-RS). The CRS is transmitted over a DL system bandwidth part and used at the user equipment (UE) to obtain a channel estimate to demodulate the data or control information. The CSI-RS is transmitted with a reduced density in the time and frequency domain compared to CRS and used at the UE for channel estimation or for channel state information (CSI) acquisition. The DM-RS is transmitted only in a bandwidth part of the respective PDSCH and used by the UE for data demodulation. For signal precoding at the gNB, several CSI-RS reporting mechanisms are used such as non-precoded CSI-RS and beamformed CSI-RS reporting. For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam direction and beam width. For beamformed/precoded UE-specific or non-UE-specific CSI-RS, a beamforming operation is applied over a single antenna port or over multiple antenna ports to have several narrow beams with high gain in different directions and, therefore, no cell-wide coverage.

In a wireless communications network system employing time division duplexing, TDD, due to channel reciprocity, the CSI is available at the base station (gNB). However, when employing frequency division duplexing, FDD, due to the absence of channel reciprocity, the channel is estimated at the UE and the estimate is fed back to the gNB. FIG. 2 shows a block-based model of a Multiple Input Multiple Output (MIMO) DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array ANTT having a plurality of antennas or antenna elements, and a precoder 206 receiving a data vector 208 and a precoder matrix F from a codebook 210.

The channel 204 may be described by the channel tensor/matrix 212. The user equipment 202 receives the data vector 214 via an antenna or an antenna array ANTR having a plurality of antennas or antenna elements. A feedback channel 216 between the user equipment 202 and the base station 200 is provided for transmitting feedback information. The previous releases of 3GPP up to Release 15 support the use of several downlink reference symbols (such as CSI-RS) for CSI estimation at the UE.

In FDD systems (up to Rel. 15), the estimated channel at the UE is reported to the gNB implicitly where the CSI report transmitted by the UE over the feedback channel includes the rank index (RI), the precoding matrix index (PMI) and the channel quality index (CQI) (and the CRI from Rel. 13) allowing, at the gNB, to decide the precoding matrix, and the modulation order and coding scheme (MCS) of the symbols to be transmitted. The PMI and the RI are used to determine the precoding matrix from a predefined set of matrices Q also referred to as codebook. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNBs equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1N_2$ positions (in total $N_t=2N_1N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the array steering vectors) of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to read the codebook and obtain the precoder. The array steering vectors may be described by the columns of a 2 Dimensional Discrete Fourier Transform (DFT) matrix when ULAs or UPAs are used for signal transmission.

The precoder matrices used in the Type-I, Type-I multi-panel and Type-II CSI reporting schemes in 3GPP New Radio Rel. 15 are defined in the frequency-domain and have a dual-stage structure (i.e., two components codebook): $F(s)=F_1F_2(s)$, $s=0 \ldots, S-1$, where S denotes the number of subbands. The first component or the so-called first stage precoder, $F_1$, is used to select a number of beam vectors from a Discrete Fourier Transform-based (DFT-based) matrix, which is also called the spatial codebook. Moreover, the first stage precoder, $F_1$, corresponds to a wide-band matrix, independent of the subband index s, and contains L spatial beamforming vectors (the so-called spatial beams) $b_l \in \mathbb{C}^{N_1 N_2 \times 1}$, l=0, . . . , L−1 selected from a DFT-based codebook matrix for the two polarizations of the antenna array, $$F_1 = \begin{bmatrix} b_0, \ldots, b_{L-1} & 0 \ldots 0 \\ 0 \ldots 0 & b_0, \ldots, b_{L-1} \end{bmatrix} \in \mathbb{C}^{2N_1 N_2 \times 2L}.$$

For the type-I codebook, L=1 such that $F_1$ is simply given by $$F_1 = \begin{bmatrix} b_0 & 0 \\ 0 & b_0 \end{bmatrix} \in \mathbb{C}^{2N_1 N_2 \times 2}.$$

The spatial codebook comprises an oversampled DFT matrix of dimension $N_1N_2 \times N_1O_1N_2O_2$, where $O_1$ and $O_2$ denote the oversampling factors with respect to the first and second dimension of the codebook, respectively. The DFT vectors in the codebook are grouped into $(q_1, q_2)$, $0 \le q_1 \le O_1-1$, $0 \le q_2 \le O_2-1$ subgroups, where each subgroup contains $N_1N_2$ DFT-based vectors, and the parameters $q_1$ and $q_2$ are denoted as the rotation oversampling factors, with respect to the first and second dimension of the antenna array, respectively.

The second component or the so-called second stage precoder, $F_2$ (s), is used to combine the selected beam vectors. This means the second stage precoder, $F_2$ (s), corresponds to a selection/combining/co-phasing matrix to select/combine/co-phase the beams defined in $F_1$ for the s-th configured sub-band. For example, for a rank-1 transmission and Type-I CSI reporting, $F_2$ (s) is given for a dual-polarized antenna array by $$F_2(s) = \begin{bmatrix} 1 \\ e^{j\delta_1} \end{bmatrix},$$

$e^{j\delta_1}$ is a quantized co-phasing factor (phase adjustment) between the two orthogonal polarizations of the antenna array. Hence, for the Type-I codebook, a single DFT-beam is selected per transmission layer of the precoding such that the transmission is directed for the strongest path component of the radio channel.

For a rank-1 transmission and Type-II CSI reporting, $F_2$ (s) is given for dual-polarized antenna arrays by $$F_2(s) = \begin{bmatrix} e^{j\delta_0} p_0 \\ \vdots \\ e^{j\delta_{2L-1}} p_{2L-1} \end{bmatrix} \in \mathbb{C}^{2L \times 1}$$

where $p_l$ and $e^{j\delta_l}$, l=0,2, . . . , 2L−1 are quantized amplitude and phase beam-combining coefficients, respectively. For rank-R transmission, $F_2$ (s) contains R vectors, wherein R denotes the transmission rank, where the entries of each vector are chosen to combine single or multiple beams within each polarization.

The selection of the matrices $F_1$ and $F_2$ (s) is performed by the UE based on reference signals such as CSI-RS and the knowledge of the channel conditions. The selected matrices are indicated in a CSI report in the form of a RI (the RI denotes the rank of the precoding matrices) and a PMI and are used at the gNB to update the multi-user precoder for the next transmission time interval.

In addition to the Type-I codebook, the Rel. 15 3GPP specification also defines a Type-I multi-panel (multi-antenna array) codebook for the case the gNB is equipped with multiple (co-located) antenna panels or antenna arrays that are possibly un-calibrated. The precoder for this codebook is similar to the Type-I codebook where a single DFT beam is applied per transmission layer of the precoding matrix. To take into account different spacing between the antenna panels and/or possible phase calibrations errors (e.g., due to different local oscillators) between the antenna panels, a per-panel co-phasing factor is applied to each panel. For example, for a rank-1 transmission and a gNB that is equipped with $N_g$=2 antenna panels, the Type-I multi-panel CSI reporting is defined as $$F(s) = \begin{bmatrix} b_0 \\ e^{j\delta_1} b_0 \\ e^{j\delta_2} b_0 \\ e^{j\delta_1} e^{j\delta_2} b_0 \end{bmatrix},$$

where $e^{j\delta_1}$ and $e^{j\delta_2}$ are quantized co-phasing factors with $e^{j\delta_2}$ being a panel-specific co-phasing factor applied to the second panel.

For the 3GPP Rel.-15 dual-stage Type-II CSI reporting, the second stage precoder, $F_2$ (s), is calculated on a subband basis such that the number of columns $$F_2 = \left[F_2^{(r)}(0) \ \ldots \ F_2^{(r)}(s) \ \ldots \ F_2^{(r)}(S-1)\right]$$

for the r-th transmission layer depends on the number of configured CQI subbands S. Here, a subband refers to a group of adjacent physical resource blocks (PRBs). A drawback of the Type-II CSI feedback is the large feedback overhead for reporting the combining coefficients on a subband basis. The feedback overhead increases approximately linearly with the number of subbands and becomes considerably large for large numbers of subbands. To overcome the high feedback overhead of the Rel.-15 Type-II CSI reporting scheme, it has been decided in 3GPP RAN #81 to study feedback compression schemes for the second stage precoder $F_2$. In several contributions, it has been demonstrated that the number of beam-combining coefficients in $F_2$ may be drastically reduced when transforming $F_2$ using a small set of DFT-based basis vectors into the transform domain referred to as the delay domain. The corresponding three-stage precoder relies on a three-stage (i.e., three components)

$$F_1 F_2^{(r)} F_3^{(r)}$$

codebook. The first component, represented by the matrix $F_1$, is identical to the Rel.15 NR component, is independent of the transmission layer (r), and contains a number of spatial domain (SD) basis vectors selected from the spatial codebook. The second component, represented by the matrix $$F_3^{(r)},$$

is layer-dependent and is used to select a number of delay domain (DD) basis vectors from a Discrete Fourier Transform-based (DFT-based) matrix which is also called the delay codebook. The third component, represented by the matrix $$F_2^{(r)},$$

contains a number of combining coefficients that are used to combine the selected SD basis vectors and DD basis vectors from the spatial and delay codebooks, respectively.

Assuming a rank-R transmission the three-component precoder matrix or CSI matrix for a configured $2N_1N_2$ antenna/CSI-RS ports and configured S subbands is represented for a first polarization of the antenna ports and r-th transmission layer as $$F^{(r,1)} = \alpha^{(r)} \sum_{l=0}^{L-1} b_l \sum_{d=0}^{D-1} \gamma_{1,l,d}^{(r)} d_d^{(r)}$$

and for a second polarization of the antenna ports and r-th transmission layer as $$F^{(r,2)} = \alpha^{(r)} \sum_{l=0}^{L-1} b_l \sum_{d=0}^{D-1} \gamma_{2,l,d}^{(r)} d_d^{(r)},$$

where $b_u$ (l=0, . . . , L−1) represents the u-th SD basis vector selected from the spatial codebook, $$d_d^{(r)} (d = 0, \ldots , D - 1)$$

is the d-th DD basis vector associated with the r-th layer selected from the delay codebook, $$\gamma_{p,l,d}^{(r)}$$

is the complex delay-domain combining coefficient associated with the u-th SD basis vector, the d-th DD basis vector and the p-th polarization, D represents the number of configured DD basis vectors, and a (r) is a normalizing scalar.

An advantage of the three-component CSI reporting scheme in the above equations is that the feedback overhead for reporting the combining coefficient of the precoder matrix or CSI matrix is no longer dependent on the number of configured CQI subbands (i.e., it is independent from the system bandwidth). Therefore, the above three-component codebook has been recently adopted for the 3GPP Rel.-16 dual-stage Type-II CSI reporting specification.

The current 3GPP NR Type-I and Type-II codebooks are designed for deployments where a gNB is equipped with a single panel or antenna array or multiple co-located panels or antenna arrays. The current 3GPP specification, however, does not support CSI reporting for so-called "distributed MIMO cooperative transmissions" where several panels or antenna arrays connected to a gNB operate as a large distributed multi-panel or multi-antenna array. Therefore, there is a need for new codebooks and CSI reporting schemes that can be used in distributed MIMO deployments. This invention according to this disclosure proposes extensions to the NR Type-II codebook and CSI reporting for distributed MIMO cooperative transmission.

There are thus drawbacks with the known solutions as described above and the present invention according to the present disclosure addresses these drawbacks.

SUMMARY

It is an objective of the embodiments herein to provide methods and apparatuses for CSI feedback reporting for a codebook based precoding in a wireless communications network such as advanced 5G networks.

According to an aspect of some embodiments herein, there is provided a method performed by a UE for generating and reporting a CSI feedback report in a wireless communications network system. The method comprising: receiving from a network node (such as gNB or eNB or any suitable network node), a CSI report configuration indicating a number of antenna port groups or CSI-RS port groups, wherein each antenna or CSI-RS port group comprises at least one antenna or CSI-RS port; determining based on the CSI report configuration a precoder matrix for a number of antenna or CSI-RS port groups; the precoder matrix being based on a first basis set and a second basis set and one or more combining coefficients for complex scaling or combining one or more basis vectors selected from the first basis set for each antenna or CSI-RS port group and one or more basis vectors selected from the second basis set, wherein the basis vectors of the first basis set are associated with the antenna or CSI-RS port groups of the precoder matrix and the basis vectors of the second basis set are associated with the frequency domain units or subbands of the precoder matrix. The method further comprises, generating a CSI report or CSI feedback report comprising a Precoder Matrix Indicator (PMI) or information related to the PMI, indicating the precoder matrix for the number of antenna or CSI-RS port groups, and transmitting over an uplink channel the generated CSI report to the network node or gNB.

According to an aspect of some embodiment herein, there is provided a method performed by a network node or gNB for receiving a CSI report generated by a UE in a wireless communications network system. The method comprising: transmitting to the UE, a CSI report configuration information indicating a number of antenna port groups or CSI-RS port groups, each antenna or CSI-RS port group comprises at least one antenna or CSI-RS port, for enabling the UE to determine based on the transmitted CSI report configuration a precoder matrix for a number of antenna or CSI-RS port groups; the precoder matrix being based on a first basis set and a second basis set and one or more combining coefficients for complex scaling or combining one or more basis vectors selected from the first basis set for each antenna or CSI-RS port group and one or more basis vectors selected from the second basis set, wherein the basis vectors of the first basis set are associated with the antenna ports of the antenna or CSI-RS port groups of the precoder matrix and the basis vectors of the second basis set are associated with the frequency domain units or subbands of the precoder matrix. The method further comprises, receiving, from the UE, over an uplink channel a CSI report or a CSI feedback report, the CSI report or CSI feedback report comprising information related to a Precoder Matrix Indicator (PMI) indicating the precoding/precoder matrix for the number of antenna or CSI-RS port groups.

According to another aspect of embodiments herein, there is provided a UE comprising a processor and a memory containing instructions executable by the processor, whereby said UE is operative or configured to perform any one of the embodiments presented in the detailed description related to the actions performed by the UE, as disclosed herein.

According to yet another aspect of embodiments herein, there is provided a network node comprising a processor and a memory containing instructions executable by the processor, whereby said network node is operative or configured to perform any one of the embodiments presented in the detailed description related to the network node, as disclosed herein.

There is also provided a computer program comprising instructions which when executed on at least one processor of the UE, cause the at least said one processor to carry out the actions or method steps presented herein.

There is also provided a computer program comprising instructions which when executed on at least one processor of the network node, cause the at least said one processor to carry out the method steps presented herein.

A carrier is also provided containing the computer program, wherein the carrier is one of a computer readable storage medium, an electronic signal, optical signal, or a radio signal.

An advantage of the embodiments herein is to significantly reduce the feedback overhead and the computational complexity at the UE for codebook-based CSI reporting for joint transmission from a network node or gNB equipped with multiple RRHs or panels or antenna arrays to the UE. Another advantage is to reduce latency of the CSI reporting.

Additional advantages of the embodiments herein are provided in the detailed description of this disclosure.

BRIEF DESCRIPTION OF THE DRAWINGS

Embodiments of the present invention are now described in further detail with reference to the accompanying drawings, in which.

DETAILED DESCRIPTION

Figure 1:
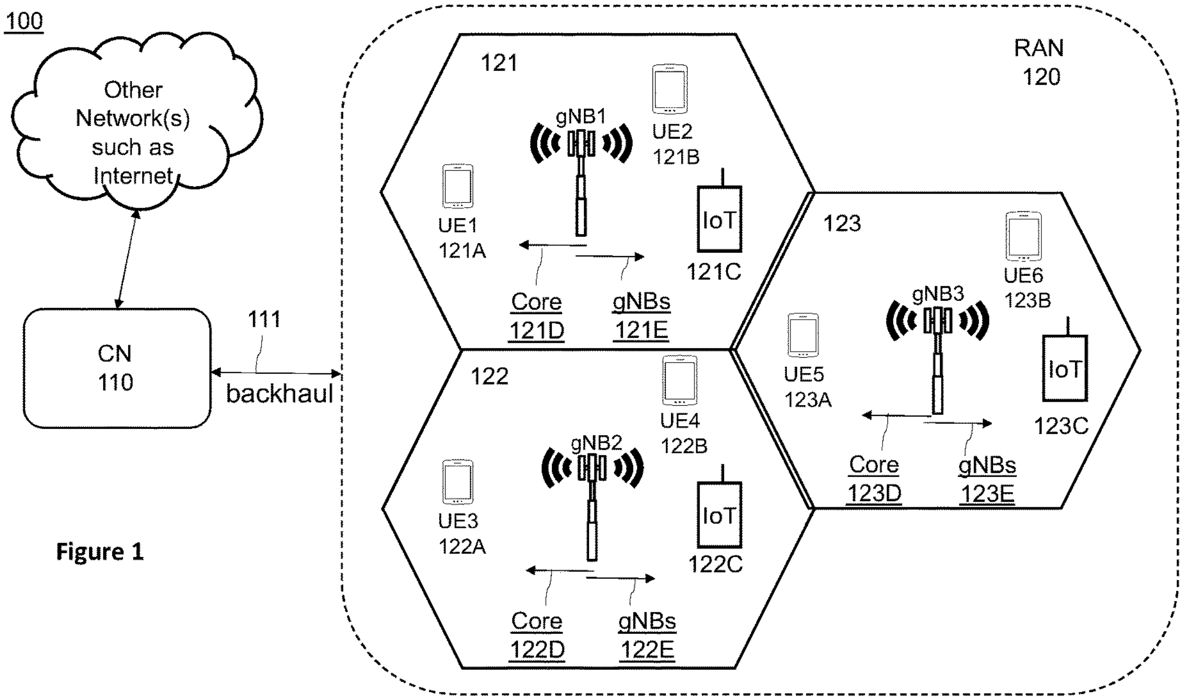
FIG. 1 shows a schematic representation of a wireless communications system.

In the following, a detailed description of the exemplary embodiments is described in conjunction with the drawings, in several scenarios to enable easier understanding of the solution(s) described herein.

The invention according to the present embodiment addresses the previously described drawbacks. In detail, methods that significantly reduce the feedback overhead and the computational complexity at the user equipment for codebook-based CSI reporting are proposed.

In general, and in accordance with some non-limiting exemplary effects achieved by the embodiments herein include a UE receiving from a network node or gNB a CSI report configuration indicating one or more antenna or CSI-RS port groups and the antenna or CSI-RS port(s) associated with the antenna or CSI-RS port groups. Each antenna or CSI-RS port group may be associated with a panel or remote radio head or antenna array of the network node or gNB. In some examples, the CSI report configuration comprises at least the four parameters $N_g$, $P_{CSI-RS}$, $N_1$, and $N_2$, whereas the value of $N_g$ and $P_{CSI-RS}$ indicate the number of panels or antenna arrays of the gNB and the total number of antenna ports per panel or across all panels or remote radio heads (RRHs) or antenna arrays of the network node/gNB, respectively, and $N_1$, and $N_2$ denote the number of antenna ports for a first dimension and a second dimension of an antenna or CSI port group (panel, RRH or antenna array), respectively. In one option, the number of antenna or CSI-RS ports, $P_{CSI-RS}$, may depend on the antenna or CSI-RS port group, and can be different for different antenna or CSI-RS port groups indicated in the CSI-RS report configuration. In another option, the number of antenna or CSI-RS ports, $P_{CSI-RS}$, is identical for all antenna or CSI-RS port groups in the CSI-RS configuration. In one option, the number of antenna ports $N_1$, and $N_2$ may depend on the antenna or CSI-RS port group, and can be different for different antenna or CSI-RS port groups indicated in the CSI-RS report configuration. In another option, the number of antenna ports $N_1$, and $N_2$ is identical for all antenna or CSI-RS port groups indicated in the CSI-RS report configuration.

It should be noted that the term "precoding" equally means "precoder". Hence, throughout this disclosure precoding and precoder are used interchangeably.

The term 'beam' is used to denote a spatially selective/directive transmission of an outgoing signal or reception of an incoming signal which is achieved by precoding/filtering the signal at the antenna ports of the device (UE or gNB) with a particular set of coefficients. The words precoding or precoder or filtering may refer to processing of the signal in the analog or digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

Figure 2:
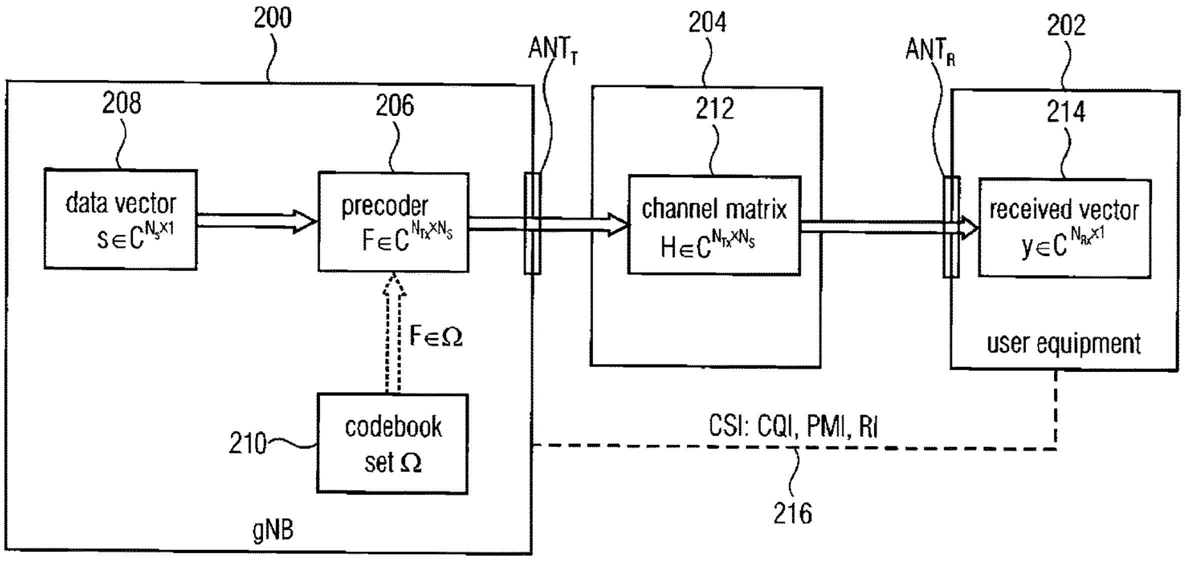
FIG. 2 shows a block-based model of a MIMO DL transmission using codebook-based-precoding in accordance with LTE Release 8.

Exemplary embodiments of the present invention may be implemented in a wireless communications system or network as depicted in FIG. 1 or FIG. 2 including transmitters or transceivers, like base stations, and communication devices (receivers) or users, like mobile or stationary terminals or IoT devices, as mentioned earlier in the background part of this disclosure.

Figure 3:
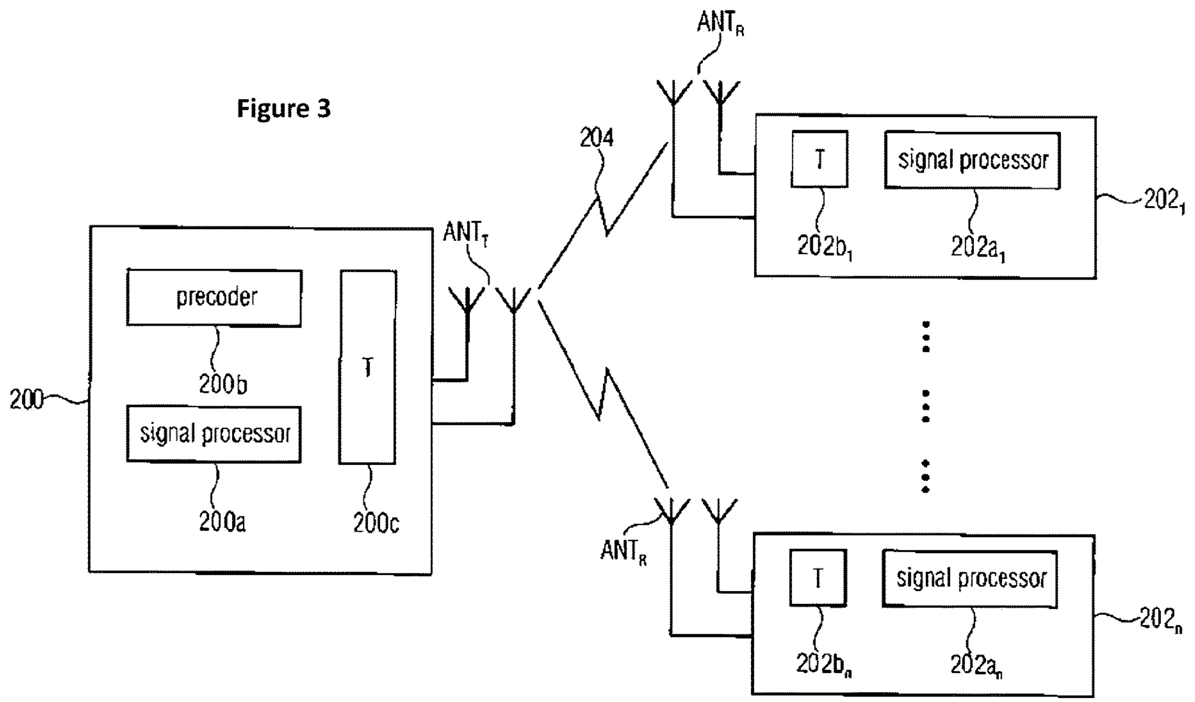
FIG. 3 is a schematic representation of a wireless communications system for communicating information between a transmitter and a plurality of receivers, according to some embodiments herein.

Referring to FIG. 3, there is depicted a schematic representation of a wireless communications system for communicating information between a transmitter 200, like a base station or a network node or a gNB, and a plurality of communication devices 2021 to 202*n*, like UEs, which are served by the base station 200. The base station 200 and the UEs 202 may communicate via a wireless communication link or channel 204, like a radio link. The base station 200 includes one or more antennas ANTT or an antenna array having a plurality of antenna elements, and a signal processor 200*a*. The UEs 202 include one or more antennas ANTR or an antenna array having a plurality of antennas, a signal processor 202*a*1, 202 an, and a transceiver 202*b*1, 202*bn*. The base station 200 and the respective UEs 202 may operate in accordance with the inventive teachings described herein.

According to embodiments herein, the UE is configured to generate a CSI report about a channel between the UE and a radio base station or gNB, or similarly between a transmitter and a receiver in a wireless communications system, whereas the radio base station or gNB or transmitter is equipped with multiple panels or remote radio heads (RRHs) or antenna arrays and the RRHs or antenna arrays are distributed in the field. The channel may be a MIMO channel.

The transmitter and/or the receiver mentioned above may include one or more of the following: a UE, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or a macro cell base station, or a small cell base station, or a central unit of a base station, or a distributed unit of a base station, or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network. A receiver may be a network node or gNB or a base station. Vice versa, a transmitter may be viewed as a radio base station or a network node or gNB, whereas a receiver may be a UE.

In the following, the main method steps performed by a UE respectively method steps performed by a network node are presented followed by detailed embodiments of the present disclosure.

Figure 4A:
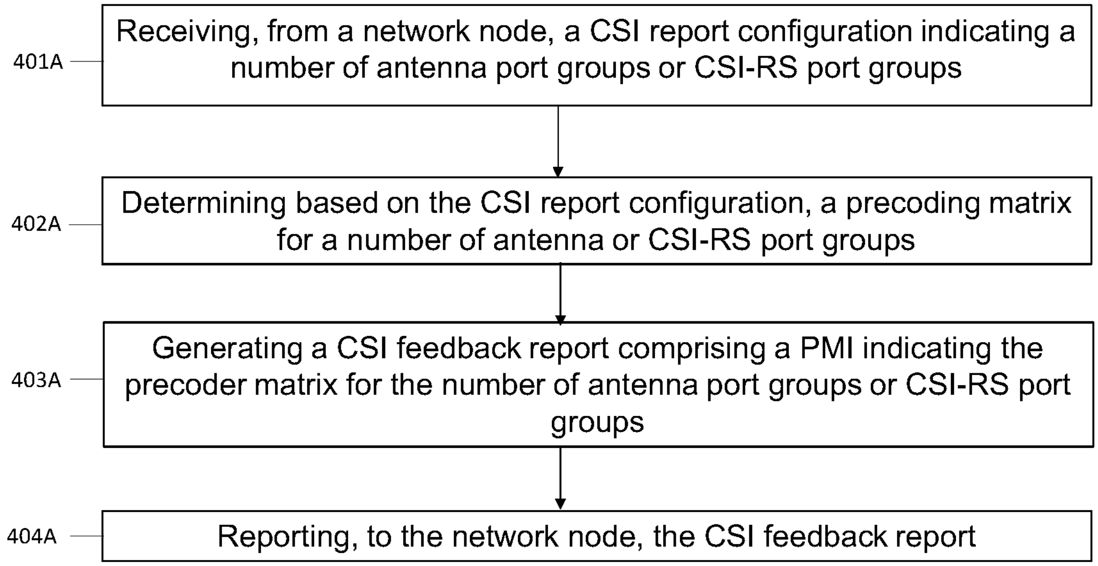
FIG. 4A illustrates a flowchart of a method performed by a UE according to some embodiments herein.

FIG. 4A illustrates the main steps of the method performed by the UE for generating (and transmitting) a CSI report or a CSI feedback report to a network node in a wireless communications network in according to embodiments herein. The method performed by the UE may be defined as a codebook-based precoder structure. The method performed by the UE comprises:

Step 401A: receiving from the network node a CSI report configuration;

As an example, the UE is provided, from the network node with a CSI report configuration via a higher layer (e.g., RRC), the CSI report configuration indicating a number of antenna port groups or CSI-RS port groups, wherein each antenna or CSI-RS port group comprises at least one antenna or CSI-RS port. In some examples, the CSI-RS report configuration indicates at least two antenna port groups or CSI-RS port groups. An antenna port, or simply port, is a CSI-RS port. In the following antenna port, port and CSI-RS port are interchangeably used. The one or more antenna ports are associated with one or more reference signals (RSs). As an example, the UE (or the receiver) is configured to receive a radio signal via a MIMO channel, wherein the radio signal includes one or more reference signals, such as one or more CSI-RS signal(s), which are associated with the antenna ports. It is assumed that the network node or gNB is equipped with multiple remote radio heads or panels or antenna arrays which are distributed in the field. An antenna or CSI-RS port group may be associated with such a panel or remote radio head or antenna array of a network node or gNB. In one embodiment, the antenna or CSI-RS port groups indicated in the CSI report configuration are associated with a single network node or gNB (e.g., the one which provides the CSI report configuration to the UE). In one embodiment, the antenna or CSI-RS port groups indicated in the CSI report configuration are associated with multiple network nodes or gNBs (e.g., different antenna or CSI-RS port groups are associated with different network nodes or gNBs).

Step 402A: determining based on the received CSI report configuration a precoder matrix for a number of antenna or CSI-RS port groups; the precoder matrix being based on a first basis set and a second basis set and a set of combining coefficients for complex scaling or combining one or more basis vectors selected from the first basis set and second basis set, wherein the basis vectors of the first basis set are associated with the antenna ports of the antenna or CSI-RS port groups of the precoder matrix and the basis vectors of the second basis set are associated with the frequency domain units of the precoder matrix;

The UE may determine, based the received CSI report configuration, the precoder matrix for a number of antenna port groups or CSI-RS groups, wherein the number of antenna port groups or CSI-RS port groups is selected by the UE from the indicated antenna port groups or CSI-RS port groups of the CSI report configuration, or the number of antenna port groups or CSI-RS port groups comprises all antenna port groups, or CSI-RS port groups indicated by the CSI report configuration.

According to an exemplary embodiment, the receiver or UE determines for each transmission layer a precoding vector or a precoder matrix based on the received radio signal, wherein the precoding vector or the precoding matrix to be used at the transmitter (such as a network node) so as to achieve a predefined property for a communication over the MIMO channel. The precoding vector or matrix for each transmission layer is determined based on the received reference signal(s) and is based on a first basis set and a second basis set, and a number of precoder coefficients for combining selected basis vectors from the first and second basis sets.

The basis vectors of the first basis set may be associated with a number of antenna or CSI-RS port groups of the precoder matrix and the basis vectors of the second basis set may be associated with the frequency units of the precoder matrix. Therefore, the precoder matrix may be defined over a 'spatial' dimension and a 'frequency' dimension.

Step 403A: generating a CSI report or CSI feedback report comprising a Precoder matrix Indicator (PMI) indicating the precoder matrix for the number of antenna or CSI-RS port groups;

Step 404A: transmitting or reporting the CSI report or CSI feedback report to the network node or gNB.

Figure 4B:
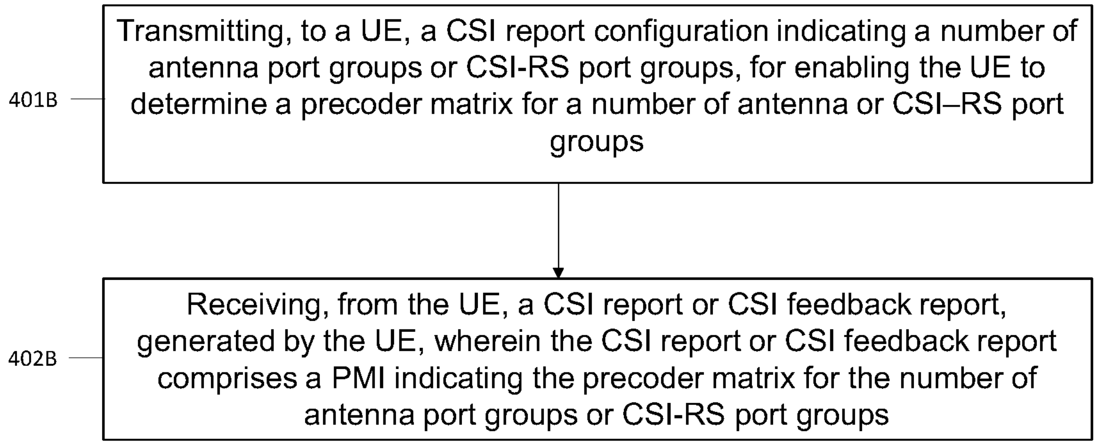
FIG. 4B illustrates a flowchart of a method performed by a network node according to some embodiments herein.

FIG. 4B illustrates the main steps of the method performed by the network node or gNB for receiving a CSI feedback report from a UE in a wireless communications network in according to embodiments herein. The method performed by the network node comprises:

Step 401B: transmitting, to the UE, a CSI report configuration;

As an example, the network node transmits to the UE a CSI report configuration via a higher layer (e.g., RRC), the CSI report configuration indicating a number of antenna port groups or CSI-RS port groups, wherein each antenna or CSI-RS port group comprises at least one antenna or CSI-RS port. As described earlier, an antenna port, or simply port, is a CSI-RS port. The one or more antenna ports are associated with one or more reference signals (RSS). As an example, the network node (or the transmitter) is configured to transmit a radio signal via a MIMO channel, wherein the radio signal includes one or more reference signals, such as one or more CSI-RS signal(s), which are associated with the antenna ports. The network node or gNB is equipped with multiple remote radio heads or panels or antenna arrays which are distributed in the field, as previously mentioned. An antenna or CSI-RS port group may be associated with such a panel or remote radio head or antenna array of the network node or gNB. In one embodiment, the antenna port groups, or CSI-RS port groups indicated in the CSI report configuration are associated with a single network node or gNB (e.g., the one which provides the CSI report configuration to the UE). In one embodiment, the antenna or CSI-RS port groups indicated in the CSI report configuration are associated with multiple network nodes or gNBs (e.g., different antenna or CSI-RS port groups are associated with different network nodes or gNBs).

As previously described, the transmitted CSI report configuration enables the UE to determine based on the CSI report configuration a precoder matrix for a number of antenna port groups or CSI-RS port groups; the precoder matrix being based on a first basis set and a second basis set and a set of combining coefficients for complex scaling or combining one or more basis vectors selected from the first basis set and second basis set, wherein the basis vectors of the first basis set are associated with the antenna ports of the antenna or CSI-RS port groups of the precoder matrix and the basis vectors of the second basis set are associated with the frequency domain units of the precoder matrix.

As mentioned earlier, the precoding vector or precoder matrix for each transmission layer is determined, by the UE, based on the received reference signal(s) and is based on a first basis set and a second basis set, and a number of precoder coefficients for combining selected basis vectors from the first and second basis sets.

The basis vectors of the first basis set may be associated with a number of antenna or CSI-RS port groups of the precoder matrix and the basis vectors of the second basis set may be associated with the frequency units of the precoder matrix. Therefore, the precoder matrix may be defined over a 'spatial' dimension and a 'frequency' dimension.

Step 402B: receiving, from the UE, a CSI report or CSI feedback report generated by the UE, wherein the CSI feedback report comprises a Precoder matrix Indicator (PMI) indicating the precoder matrix for the number of antenna or CSI-RS port groups;

First Basis Set

In accordance with an embodiment, each basis vector of the first basis set is defined by an DFT-vector or IDFT-vector of size $N_1N_2\times1$ similar to the 3GPP Release 15 Type-II codebook, wherein $N_1$ and $N_2$ represent the number of elements of the antenna array or panel with respect to a first and second dimension, respectively. In some examples, the first basis set is defined by an DFT- or IDFT-based matrix. In some examples, the first basis set is defined by an oversampled DFT- or IDFT-based matrix. In one option, the first basis set comprises multiple first basis sets, wherein each first basis set may be associated with an antenna or CSI-RS port group indicated in the CSI report configuration. A basis vector of a first basis set may be defined by a DFT- or IDFT-based vector of size $N_1N_2\times1$ and by at least the two parameters $N_1$ and $N_2$ as defined above. The two parameters $N_1$ and $N_2$ may depend on the antenna or CSI-RS port group and can be different for different antenna or CSI-RS port groups indicated in the CSI report configuration.

In accordance with an embodiment, the first basis set comprises P basis vectors of size P×1, wherein the p-th basis vector is defined by the all-zero vector expect the p-th entry which is one. Hence, the second basis set is defined by an identity matrix of size P×P. The parameter P may be configured or indicated from a network node to the user equipment via a higher layer. P may take any suitable value. In some examples, $P=P_{CSI-RS}/2$, where $P_{CSI-RS}$ denotes the number of CSI-RS ports configured to the UE. In some examples, $P_{CSI-RS}$ may depend on the antenna or CSI-RS port group and can be different for different antenna or CSI-RS port groups.

Second Basis Set

In accordance with an embodiment, each basis vector of the second basis set is defined by an DFT-vector or IDFT-vector of size $N_3\times1$. The second basis set may comprise $N_3$ basis vectors, wherein $N_3$ is a number of subbands or PRBs or frequency domain units/components of the precoder matrix used for CSI reporting. The parameter $N_3$ is configured to the UE, fixed in the NR specifications, and hence a priori known by the UE, or reported by the UE. $N_3$ may take any suitable value.

Structure of Precoder Matrix

In accordance with an embodiment, the precoder matrix may be associated with $N_g$ antenna or CSI-RS port groups. The precoder matrix may comprise $N_g$ precoder matrices, wherein each precoder matrix is associated with a single antenna or CSI-RS port group.

The precoding vector or precoding matrix $W^{g,l}$ for the I-th transmission layer is defined over a number of frequency units/PRBs or frequency domain precoder units ($N_3$) and spatial units ($2N_1N_2$ or $P_{CSI-RS}$). In an exemplary embodiment, the precoding vector or precoding matrix $w^{g,l}$ of the I-th transmission layer and g-th antenna or CSI-RS port group is defined by:

$$W^{g,l}=\alpha W_{1,g,l}W_{2,g,l}W_{f,g,l}^{H},\text{ or}$$

$$W^{g,l}=\alpha\sum_{m=0}^{L_v-1}\sum_{i=0}^{M_v-1}c_{g,l,m,i}\left(b_{g,l,m}a_{g,l,m,i}^{H}\right)=\alpha\sum_{i=0}^{M_v-1}\sum_{m=0}^{L_v-1}c_{g,l,m,i}\left(b_{g,l,m}a_{g,l,m,i}^{H}\right),\text{ or}$$

-continued $$W^{g,l}=\alpha\begin{bmatrix}\sum_{m=0}^{L_v-1}\sum_{i=0}^{M_v-1}c_{g,l,m,i}\left(b_{g,l,m}a_{g,l,m,i}^H\right)\\ \sum_{m=0}^{L_v-1}\sum_{i=0}^{M_v-1}c_{g,l,m+L_v-1,i}\left(b_{g,l,m+L_v-1}a_{g,l,m+L_v-1,i}^H\right)\end{bmatrix},$$

where:

- $W_{1,g,l}$ is a matrix comprising $L_v$ selected basis vectors from the first basis set,
- $W_{2,g,l}$ is a coefficient matrix, $$W_{f,g,l}^H$$

is a matrix comprising $M_v$ basis vectors, where each vector is associated with the $N_3$ frequency units of the precoder matrix,
- $b_{g,l,m}$ is a $N_1N_2\times 1$ or $P\times 1$ basis vector associated with the antenna ports of the g-th antenna or CSI-RS port group of the precoder matrix,
- $a_{g,l,m,i}$ is a $N_3\times 1$ basis vector associated with the $N_3$ frequency units of the precoder matrix,
- $c_{g,l,m,i}$ is a complex precoder coefficient or combining coefficient,
- $\alpha$ is a normalization factor.

In accordance with an embodiment, the precoder matrix may comprise multiple precoder matrices, wherein each precoder matrix is associated with an antenna port group or CSI-RS port group.

Number of Frequency Units/Subbands:

In accordance with an embodiment, the UE is configured to determine the dimension of the second basis set $N_3$ based on the higher layer configuration parameter, number of CQI subbands $N_{CQI}$ as $N_3=[QN_{CQI}]$, where $Q\geq 1$ and Q is indicated in the CSI report by the UE.

In accordance with an embodiment, the UE is configured to determine the dimension of the second basis set $N_3$ based on the parameter Q and number of CQI subbands $N_{CQI}$ as $N_3=[Q\cdot N_{CQI}]$, wherein the parameter Q is higher layer configured to the UE or known to the UE, e.g., fixed in the NR specification.

Indication of Selected Basis Vectors in the CSI Report

In accordance with embodiments, the UE is configured to select per antenna or CSI-RS port group one or more basis vectors from the first basis set and one or more basis vectors from the second basis set, and one or more combining coefficients for combining the selected vectors from the basis sets. Moreover, the UE is configured to indicate the selected basis vectors from the first and second basis sets and the selected combining coefficients in the CSI report.

In accordance with embodiments, the UE is configured to select per antenna or CSI-RS port group $L_v$ basis vectors from the first basis set for a number of antenna or CSI-RS port groups of the precoder matrix. In one option, the parameter $L_v$ may be identical for all antenna or CSI-RS port groups of the precoder matrix. In another option, the parameter $L_v$ may be different for a number of antenna or CSI-RS port groups of the precoder matrix. In some examples, the parameter $L_v$ may be identical for all v transmission layers of the precoder matrix. In some examples, the parameter $L_v$ may depend on the transmission layer and may be different for the v transmission layers of the precoder matrix. The parameter(s) $L_v$ may be configured to the UE, or reported by the UE, or fixed in the NR specifications and known to the UE.

In accordance with embodiments, the UE is configured to indicate the one or more selected basis vector(s) from the first basis set or multiple first basis sets in the CSI report. In some examples, the UE reports a $$\left\lceil\log_2\binom{N_3}{M_v}\right\rceil \text{ or } \left\lceil\log_2\binom{N_3-1}{M_v-1}\right\rceil$$

bit indicator per antenna or CSI-RS port group indicating the selected $L_v$ basis vectors.

In accordance with embodiments, the UE indicates the selected basis vectors from the second basis set per antenna or CSI-RS port group or for a number of antenna or CSI-RS port groups by an indicator per transmission layer or subset of transmission layer(s) of the precoder matrix in the CSI report. For example, the indicator is given by a $$\left\lceil\log_2\binom{N_1N_2}{L_v}\right\rceil$$

combinatorial bit indicator, wherein $N_3$ and $M_v$ denote the number of basis vectors from the second set and the number of selected basis vectors from the second set for layer v of the precoder matrix, respectively. The parameter $M_v$ can be identical for a number of antenna or CSI-RS port groups, or identical for all number of antenna or CSI-RS port groups, or different for different antenna or CSI-RS port groups of the precoder matrix. Moreover, the parameter $M_v$ can be identical for a subset (e.g., for the first and second layers, v=0,1) of layers or all layers of the precoder matrix associated with an antenna or CSI-RS port group, or different per layer or subset of layers of the precoder matrix associated with an antenna or CSI-RS port group.

In the following, it is assumed that the number of selected basis vectors, My, from the second basis set is either configured via a higher layer (e.g., RRC), or fixed in the NR specifications and hence known to the UE or reported by the UE.

Note that for the above reporting scheme a large number of uplink resources is required for the indication of the selected basis vectors associated with the precoder matrix. Therefore, several schemes are proposed in the following that reduce the CSI feedback overhead.

CSI Feedback Overhead Reduction by Two-Step Indication

In accordance with an embodiment, the UE is configured to indicate the selected basis vectors from the second basis set per antenna or CSI-RS port group of the precoder matrix in the CSI report. For this scheme, the UE applies a two-step indication for reducing the feedback overhead in the CSI report, wherein a first indicator indicates $M_v$ selected basis vector(s) from the second basis set across $L_v$ selected basis vectors from the first basis set associated with an antenna or CSI-RS port group (e.g., by a $$\left\lceil\log_2\binom{N_3}{M_v}\right\rceil \text{ or } \left\lceil\log_2\binom{N_3-1}{M_v-1}\right\rceil$$

bit indicator), and a second indicator indicates the selected basis vectors (up to $M_v$ basis vectors) from the $M_v$ ($M_v<N_3$) selected basis vectors indicated by the first indicator for each (or a subset) of the $L_v$ selected basis vectors from the first basis set. In some examples, $L_v$=1,2,3, or 4. In some examples, $L_v$ is different for at least two antenna or CSI-RS port groups of the precoder matrix. In some examples, $L_v$ is different for a subset of the transmission layers of the precoder matrix. In some examples, the second indicator is defined by a bitmap of size $M_v L_v \times 1$ or $2M_v L_v \times 1$, wherein each bit in the bitmap is associated with a basis vector indicated by the first indicator and a selected basis vector from the first basis set. In some examples, the second indicator is specific for each transmission layer of the precoder matrix. This means, when the precoder matrix has v transmission layers, the CSI report comprises v second indicators (e.g., v bitmaps). The CSI report comprises the first and second indicators. In some examples, My depends on the antenna or CSI-RS port group and is different for a number of antenna or CSI-RS port groups of the precoder matrix.

CSI Feedback Overhead Reduction by Multi-Step Indication

In accordance with an embodiment, the UE applies a multi-step indication for reducing the feedback overhead in the CSI report, wherein a first indicator in the CSI report indicates $$N_3'$$

$$(N_3' < N_3)$$

basis vector(s) from the second basis set across all antenna or CSI-RS port groups of the precoder matrix. In some examples, the first indicator is given by a combinatorial bit indicator, e.g., by a $$\left\lceil \log_2 \binom{N_3}{N_3'} \right\rceil \text{ or } \left\lceil \log_2 \binom{N_3 - 1}{N_3' - 1} \right\rceil$$

bit indicator, wherein $$N_3'$$

denotes the number of selected basis vectors across all antenna or CSI-RS port groups of the precoder matrix, and $N_3$ denotes the total number of basis vectors of the second basis set. The first indicator is indicated by the UE in the CSI report.

Figure 5:
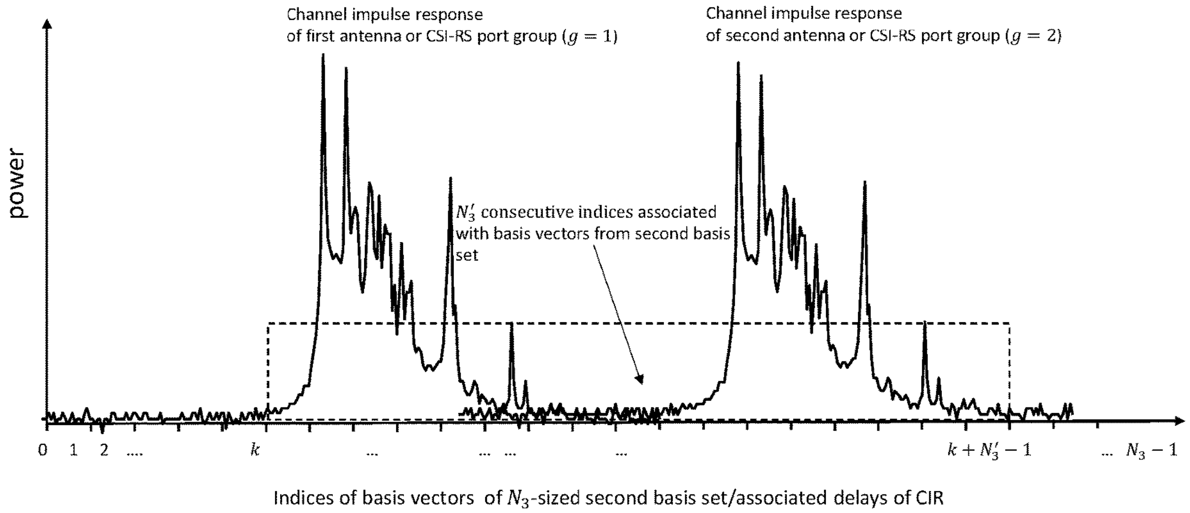
FIG. 5 illustrates a beam-formed channel impulse response of two antenna or CSI-RS port groups and the associated value range of the indices of the basis vectors of the second basis set according to some embodiments herein.

One of the findings of this invention of this disclosure is that the delays by means of selected basis vectors of the second basis set used for the precoder matrix for each antenna or CSI-RS port group are restricted in a range of size $$N_3',$$

wherein $$N_3' < N_3,$$

and $N_3$ denotes the number of basis vectors of the second basis set. Each index of the second basis set is associated with a delay of the precoder matrix. The value range of the delays selected by the UE for the precoder matrix depends on the delay spread of the beam-formed channel impulse response obtained when combining the first stage precoders $W_{g,1}$ (comprising the selected basis vectors from the first basis set of the precoder matrix) for a number of antenna or CSI-RS port groups with the MIMO channel impulse response measured at the UE from the received signals (e.g., CSI-RS). FIG. 5 illustrates an example of the beam-formed channel impulse response of two antenna or CSI-RS port groups and the value range of the associated delays (i.e., the indices of the DFT-based vectors of the second basis set) of the precoder matrix. It can be observed that the selected basis vectors are in range of $$N_3'$$

basis vectors. For the example in FIG. 5, the indices of the basis vectors associated with the limited set of $$N_3'$$

basis vectors are given by the index sets $$\{k, k+1, \ldots, k+N_3'-1\}.$$

In some examples, the first indicator indicates a subset of consecutive indices associated with the basis vectors of the second basis set across all antenna or port groups. Assuming that the second basis set comprises $N_3$ basis vectors, wherein the $N_3$ basis vectors are associated with indices from 0 to $N_3-1$, the first indicator indicates a set of $$N_3'$$

consecutive indices $$\{\text{mod}(k, N_3), \ldots, \text{mod}(k+N_3'-1, N_3)\}$$

in a modulo sense. Here, k denotes the starting index of the set. The parameter k can be configured to the UE, or reported by the UE, or it is fixed in the NR specifications and known to the UE. In accordance with embodiments, the $$N_3'$$

basis vector(s) of the second basis set across all antenna or CSI-RS port groups of the precoder matrix are configured to the UE, or they are known to the UE (i.e., they are fixed in the NR specifications). When the $$N_3'$$

basis vector(s) are known to the UE, or configured to the UE, the CSI report does not comprise the first indicator. In some examples, the parameter $$N_3'$$

is reported by the UE. In some examples, the parameter $$N_3'$$

is configured to the UE, or fixed in the NR specifications and known to the UE.

In accordance with an embodiment, the UE determines one or more selected basis vector(s) from the $$N_3'$$

basis vectors indicated by the first indicator for each antenna or CSI-RS port group of the precoder matrix. The second indicator indicates the selected basis vector(s). In one example, the second indicator is defined by a combinational bit indicator, e.g., by a $$\left\lceil \log_2 \binom{N_3'}{M_v} \right\rceil \text{ or } \left\lceil \log_2 \binom{N_3'-1}{M_v-1} \right\rceil$$

bit indicator, where $M_v$ denotes the number of selected basis vectors from the $$N_3'$$

basis vectors indicated by the first indicator. In another example, the second indicator is defined by a bitmap of size $$N_3' \times 1 \text{ or } N_3' - 1 \times 1,$$

wherein each bit in the bitmap is associated with a basis vector. In accordance with embodiments, the $M_v$ basis vector(s) selected from the $$N_3'$$

basis vectors indicated by the first indicator for an antenna or CSI-RS port group of the precoder matrix are reported by the UE, or configured to the UE, or known to the UE (i.e., they are fixed in the NR specifications). When the $M_v$ basis vector(s) are known to the UE, or configured to the UE, the CSI report does not comprise the second indicator. In some examples, the second indicator may be determined for each the antenna or CSI-RS port group of the precoder matrix. The CSI-report may comprise one or multiple (per antenna or CSI-RS port group) second indicators.

In accordance with an embodiment, the UE is configured to select and indicate a subset of the selected basis vectors indicated by the second indicator and associated with each of the $L_v$ selected basis vectors from the first basis set by a third indicator in the CSI report. In some examples, the third indicator is defined by a bitmap of size $M_vL_v\times1$ or $2M_vL_v\times1$, wherein each bit in the bitmap is associated with a basis vector indicated by the second indicator and a selected basis vector from the first basis set. Note that a basis vector indicated by the second indicator can be associated with multiple selected basis vectors from the first basis set. In some examples, the third indicator is specific for each transmission layer of the precoder matrix. This means, when the precoder matrix has v transmission layers, the CSI report comprises v third indicators (e.g., v bitmaps). In some options, the CSI report may comprise the first, second and third indicators.

In accordance with an embodiment, the UE is configured to select and indicate a subset of the selected basis vectors indicated by the first indicator and associated with each of the $L_v$ selected basis vectors from the first basis set by a second indicator in the CSI report. In some examples, the second indicator is defined by a bitmap of size $$N_3'L_v \times 1 \text{ or } 2N_3'L_v \times 1,$$

wherein each bit in the bitmap is associated with a basis vector indicated by the first indicator and a selected basis vector from the first basis set. In some examples, the second indicator is specific for each transmission layer of the precoder matrix. This means, when the precoder matrix has v transmission layers, the CSI report comprises v second indicators (e.g., v bitmaps). In some options, the CSI report may comprise the first and second indicators.

Complexity and Overhead Reduction by Reducing the Basis Set Size

Figure 6:
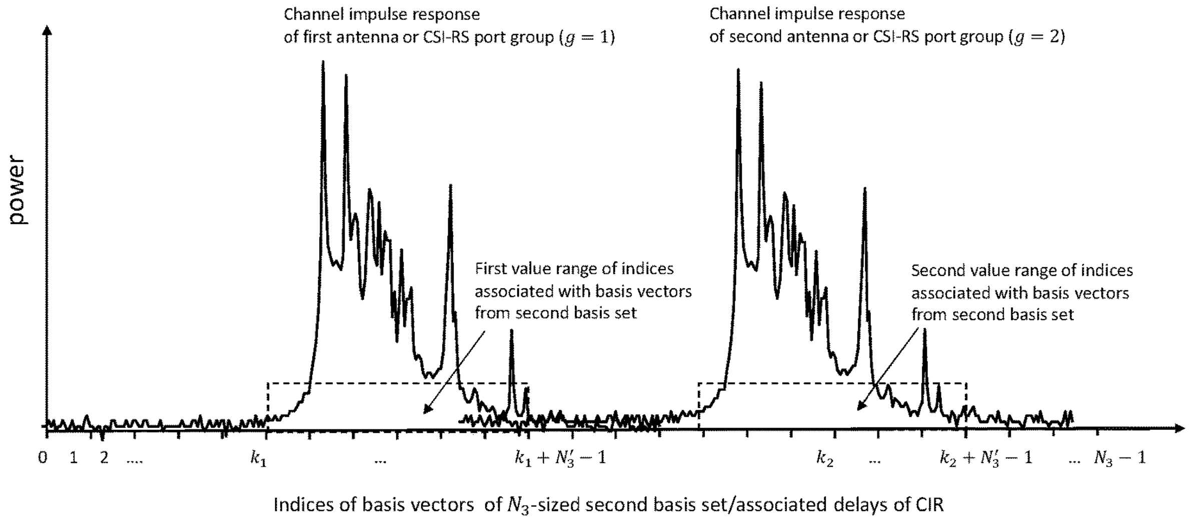
FIG. 6 illustrates a beam-formed channel impulse response of two antenna or CSI-RS port groups and the associated value range of the indices of the basis vectors of the second basis set for each antenna or CSI-RS port group of the precoder matrix according to some embodiments herein.

When the second basis set is given by a DFT-based matrix, each basis vector of size $N_3\times1$ defines a linear phase increase over the $N_3$ frequency units of the precoder matrix. Hence, each basis vector can be associated with a "delay" of the precoder matrix in the transformed ("delay") domain. One of the main findings of this invention is that the delays used for the precoder matrix for each antenna or CSI-RS port group are restricted in a small range of size $$N_3',$$

wherein $$N_3' < N_3,$$

and $N_3$ denotes the number of basis vectors of the second basis set. This value range may depend on the delay spread of the beam-formed channel impulse response obtained when combining the first stage precoders $W_{g,1}$ (comprising the selected basis vectors from the first basis set of the precoder matrix) for a number of antenna or CSI-RS port groups with the MIMO channel impulse response measured at the UE from the received signals (e.g., CSI-RS). FIG. 6 illustrates an example of the beam-formed channel impulse response of two antenna or CSI-RS port groups and the value range of the associated delays (i.e., the indices of the DFT-based vectors from the second basis set) of each antenna or CSI-RS port group of the precoder matrix. It is observed from FIG. 6 that due to the different relative distances between the antenna or CSI-RS port groups (i.e., RRHs or panels or antenna arrays of the network node/gNB) the beam-formed channel impulse response may comprise several main peaks and few delay values around the main peaks, whereas each main peak is associated with an antenna or CSI-RS port group. Therefore, instead of determining the basis vectors for the precoder matrix from a full set of $N_3$ basis vectors for each antenna or CSI-RS port group, it is sufficient to select the basis vectors from a limited set of $$N_3'$$

basis vectors, wherein $$N_3' < N_3.$$

For the example in FIG. 6, the indices of the basis vectors associated with the limited set of $$N_3'$$

basis vectors are given by the index sets $$\{k_1, k_1+1, \ldots, k_1+N_3'-1\}$$

and $$\{k_2, k_2+1, \ldots, k_2+N_3'-1\}$$

for the first and second antenna or CSI-RS port groups, respectively. In this way, the complexity of the basis vector selection for the precoder matrix and the overhead for the indication of the selected basis vectors in the CSI report can be greatly reduced. Note that the number of basis vectors, $$N_3',$$

can be identical for a number of antenna or CSI-RS ports, or different for a number of antenna or CSI-RS port groups of the precoder matrix.

In accordance with an embodiment, the UE is configured to select one or more basis vectors for an antenna or CSI-RS port group of the precoder matrix from a reduced-size (antenna-group-specific) basis set comprising $$N_3'$$

basis vectors from the $N_3$-sized second basis set, wherein $$N_3' < N_3.$$

The basis vectors of the antenna-group-specific basis set can be identical for a number of antenna or CSI-RS port groups of the precoder matrix, or different for each antenna or CSI-RS port group of the precoder matrix. For example, it can be expected that when antenna arrays or panels are close to each other the channel characteristics (delay spread, average delays) with these antenna or CSI-RS port groups are very similar and the number of basis vectors of these antenna-group-specific basis sets are identical. In one option, the basis vectors of the antenna-group-specific basis sets are indicated in the CSI report. In another option, the basis vectors of the antenna-group-specific basis sets are configured to the UE. In another option, the basis vectors of the antenna-group-specific basis sets are known to the UE (i.e., fixed in the NR specifications).

In accordance with an embodiment, the UE is configured to select one or more basis vector(s) from the antenna-group-specific basis set for each antenna or CSI-RS port group of the precoder matrix and to indicate the selected basis vector(s) or the associated index/indices of the selected basis vector(s) in the CSI report.

Assuming that the basis vectors of the second basis set are associated with indices from 0 to $N_3-1$, the indices of the $$N_3'$$

basis vectors associated with the g-th antenna or CSI-RS port group of the precoder matrix can be represented by an $$N_3'$$

sized antenna-group-specific basis index set $$\mathcal{R}_g = \{i_0, i_1, \ldots i_k, \ldots, i_{N_3'-1}\},\ i_k \in \{0, \ldots, N_3-1\}.$$

In an exemplary embodiment, the antenna-group-specific basis index set comprises $N_3'$ consecutive indices and is defined by $$\mathcal{R}_g = \{\mathrm{mod}(k_g+0, N_3), \mathrm{mod}(k_g+1, N_3), \ldots, \mathrm{mod}(k_g+N_3'-1, N_3)\},$$

where $k_g$ is a parameter indicating the first index of the antenna-group-specific basis set and mod (a,b) denotes the modulo function of a modulo b.

In accordance with embodiments, the parameter $$N_3'$$

indicating the size of the antenna-group-specific basis index set is either configured to the UE, reported by the UE, or known by the UE.

In accordance with embodiments, the parameter(s), $k_g$, representing the first index/indices of the antenna-group-specific basis set(s) are selected by the UE and indicated in the CSI report, or configured to the UE, or fixed in the NR specifications and known to the UE.

In accordance with an embodiment, $k_g=0$ for the antenna-group-specific basis index set of a reference antenna or CSI-RS port group of the precoder matrix and is not indicated in the CSI report. In some examples, the reference antenna or CSI-RS port group is the first antenna or CSI-RS port group of the precoder matrix.

In accordance with an embodiment, the UE is configured to select one or more basis vector(s) from the antenna-group-specific basis set for each antenna or CSI-RS port group of the precoder matrix, and to indicate the associated basis index/indices of the selected basis vector(s) in the CSI report. In an exemplary embodiment, the basis index/indices of My selected basis vectors are indicated by a $$\left\lceil \log_2 \binom{N_3'}{M_v} \right\rceil \text{ or } \left\lceil \log_2 \binom{N_3'-1}{M_v-1} \right\rceil$$

combinatorial bit indicator in the CSI report. In an exemplary embodiment, the index/indices associated with the selected basis vector(s) are indicated by a bitmap of size $$N_3' \times 1 \text{ or } N_3' - 1 \times 1$$

in the CSI report, wherein each bit in the bitmap is associated with an index of the $$N_3'$$

-sized antenna-group specific basis set.

Mapping of Basis Indices

Assuming that for a number of antenna or CSI port groups of the precoder matrix the number of indices of the antenna-group-specific basis index sets is identical, the antenna-group-specific basis index set can be represented by a common basis index set (i.e., common for the number of antenna or CSI-RS port groups), and a parameter indicating a relative shift of the indices of the common basis index set with respect to the indices of the antenna-group-specific basis index set. In some examples, the common basis index set is a proper subset of $\{0, \ldots, N_3-1\}$.

In accordance with an embodiment, the indices associated with the $N_g$ basis vectors from the second basis set of an antenna port group or CSI-RS port group of the precoder matrix can be represented by a common basis index set and a parameter indicating a relative shift of the indices of the common basis index set, wherein $$N_3' < N_3.$$

In accordance with an embodiment, the parameter $$N_3'$$

indicating the number of elements of the common basis set for a number of antenna port groups or CSI-RS port groups of the precoder matrix is configured to the UE from a network node, or reported by the UE to a network node, or it fixed in the NR specifications and known to the UE.

In accordance with an embodiment, the parameter(s) indicating the relative shift(s) of the indices of the common basis index set for a number of antenna or CSI-RS port groups of the precoder matrix is/are selected by the UE and indicated in the CSI report.

In an exemplary embodiment, the parameter indicating the relative shift associated with a reference antenna or CSI-RS port group of the precoder matrix is fixed and known to the gNB, and hence not indicated in the CSI report. In some examples, the reference antenna or CSI-RS port group is the first antenna or CSI-RS port group of the precoder matrix.

In accordance with an embodiment, the parameter(s) indicating the relative shift(s) of the indices of the common basis index set for a number of antenna or CSI-RS port groups of the precoder matrix are configured to the UE, e.g., via a higher layer (RRC).

In accordance with an embodiment, the parameter(s) indicating the relative shift(s) of the indices of the common basis index set for a number of antenna or CSI-RS port groups of the precoder matrix are fixed in the NR specifications and known to the UE.

In some examples, the common basis index set is identical for a number of antenna or CSI-RS port groups of the precoder matrix, or identical for all antenna or CSI-RS port groups of the precoder matrix. In some examples, the common basis index set is identical for at least two antenna or CSI-RS port groups of the precoder matrix.

In accordance with embodiments, the parameter indicating the number of indices of the common basis set is selected by the UE and indicated in the CSI report, or configured to the UE, or fixed in the NR specifications and known to the UE.

In accordance with an exemplary embodiment, the common basis index set, $\mathcal{B}$ , is given by $$N_3'$$

consecutive indices (integer values). In some examples, $$\mathcal{B} = \{0, 1, \ldots N_3' - 1\}.$$

In accordance with an exemplary embodiment, the parameter indicating the relative shift of the indices of the common basis index set for an antenna or CSI-RS port group of the precoder matrix is selected from $\{0, \ldots, N_3-1\}$.

In accordance with an embodiment, there is a one-to-one mapping between an index of an antenna-group-specific basis index set and an index of the common basis set. In an exemplary embodiment, the mapping between the $$N_3'$$

consecutive indices of the common basis set $$\mathcal{B} = \{0, 1, \ldots N_3' - 1\}$$

and the $$N_3'$$

consecutive indices of the antenna-group-specific basis index set, $\mathcal{R}_g$, are defined in a modulo sense by $$\mathcal{R}_g = \{\text{mod}(k_g + 0, N_3), \text{mod}(k_g + 1, N_3) \text{ .... }, \text{mod}(k_g + N_3' - 1, N_3)\},$$

where $k_g$ denotes a relative shift and mod (a,b) denotes the modulo function of a modulo b.

In accordance with an embodiment, the UE is configured to select one or more basis vector(s) from the antenna-group-specific basis set for each antenna or CSI-RS port group and one or more transmission layers of the precoder matrix, map the associated indices of the one or more selected basis vector(s) to basis index/indices of the common basis set, and to indicate the mapped basis index/indices by an antenna-group-specific indicator in the CSI report. The mapped basis index/indices from the CSI report are taken by the gNB and re-mapped to the antenna-group-specific basis indices. In an exemplary embodiment, the mapped basis index/indices of $M_v$ selected basis vectors are indicated by a $$\left\lceil \log_2 \binom{N_3'}{M_v} \right\rceil \text{ or } \left\lceil \log_2 \binom{N_3' - 1}{M_v - 1} \right\rceil$$

combinatorial bit indicator in the CSI report for each layer or subset of layers of the precoder matrix. In an exemplary embodiment, the mapped basis index/indices are indicated by a bitmap of size $$N_3' \times 1 \text{ or } N_3' - 1 \times 1$$

in the CSI report for each layer or subset of layers of the precoder matrix, wherein each bit in the bitmap is associated with a basis index/vector of the $$N_3'$$

-sized antenna-group specific basis set.

In accordance with an embodiment, the UE is configured to select and indicate a subset of the associated basis vectors indicated by the antenna-group-specific indicator for each of the $L_v$ selected basis vectors from the first basis set for an antenna or CSI-RS port group of the precoder matrix by a further indicator in the CSI report. The further indicator may be represented by a combinatorial indicator or by a bitmap. For example, the further indicator may be represented by a bitmap of size $M_vL_v\times1$ or $2M_vL_v\times1$, wherein each bit in the bitmap is associated with a basis vector indicated by the antenna-group-specific indicator and a selected basis vector from the first basis set. In some examples, the further indicator is specific for each transmission layer of the precoder matrix. This means, when the precoder matrix has v transmission layers, the CSI report comprises v further indicators (e.g., v bitmaps).

Reporting of Non-Zero Precoder Coefficients

In accordance with an embodiment, the UE is configured to determine from the set of precoder or combining coefficients a subset or proper subset of non-zero precoder or combining coefficients and indicate the subset or proper subset of precoder or combining coefficients in the CSI report.

In accordance with an embodiment, the UE is configured to normalize the combining coefficients of the precoder matrix across all antenna or CSI-RS port groups with respect to the strongest combining coefficient such that the normalized combining coefficients of the precoder matrix comprise at least one coefficient represented by $Ae^{-j2\pi\delta}$, where A=1 and δ=0.

In accordance with an embodiment, the UE is configured to indicate the strongest combining coefficient of the precoder matrix in the CSI report.

In accordance with an embodiment, the strongest combining coefficient of the precoder matrix and the associated indicator in the CSI report is associated with the reference antenna or CSI-RS port group.

In accordance with an embodiment, the parameter indicating the relative shift for the antenna-group-specific basis index of the reference antenna or CSI-RS port group is not indicated in the CSI report.

In accordance with an embodiment, the parameter indicating the relative shift of the reference antenna or CSI-RS port group is configured to the UE by the network node.

In accordance with an embodiment, the parameter indicating the relative shift of the reference antenna or CSI-RS port group is fixed in the NR specifications. In some examples, the value of the parameter indicating the relative shift of the reference antenna or CSI-RS port group is zero.

Quantization of Precoder (Combining) Coefficients

In the following embodiments, efficient decomposition and quantization schemes for reporting the amplitude and phase of the combining or precoder coefficients of the precoder matrix are presented according to the following. These schemes reduce the signaling overhead for reporting the combining coefficients of the precoder matrix.

In accordance with an embodiment, a combining or precoder coefficient of the precoder matrix is decomposed and quantized into two or more amplitude coefficients and one phase coefficient.

In a first scheme, the combining of precoder coefficient $c_{g,l,m,i}$ associated with the g-th antenna or CSI-RS port group and l-th layer of the precoder matrix is written as a product of three coefficients $$c_{g,l,m,i} = a_{g,l,m,i} b_{g,l,m,i} d_{g,l,m,i},$$

where $a_{g,l,m,i}$ is an amplitude coefficient, $b_{g,l,m,i}$ is a differential amplitude coefficient, and $d_{g,l,m,i}$ is a complex-valued unit-magnitude coefficient to indicate the phase of $c_{g,l,m,i}$. In some $$d_{g,l,m,i} = \exp\left(\frac{j2\pi n}{2^N}\right);\ j = \sqrt{-1},\ n \in \{0, 1, \ldots, 2^N - 1\},\ N \in \{1, 2, 3, 4\}.$$

In certain embodiments, $a_{g,l,m,i}$ is a reference amplitude coefficient and identical for all spatial domain basis vectors ($b_{g,l,m}$) associated with a single polarization of the precoder matrix. In certain embodiments, $a_{g,l,m,i}$ is a reference amplitude coefficient and identical for all spatial domain basis vectors ($b_{g,l,m}$) associated with both polarizations of the precoder matrix.

In some examples, a single reference amplitude coefficient is reported per polarization and antenna or CSI-RS port group of the precoder matrix.

In some examples, a single reference amplitude coefficient is reported per polarization of the precoder matrix for a number of antenna or CSI-RS port groups of the precoder matrix.

In some examples, a single reference amplitude coefficient is reported for both polarizations of the precoder matrix for a number of antenna or CSI-RS port groups of the precoder matrix.

In certain embodiments, the reference amplitude coefficients are normalized such that a single reference coefficient associated with an antenna or CSI-RS port group (e.g., the reference antenna or CSI-RS port group) of one polarization is one and not reported.

In certain embodiments, the reference amplitude coefficients are normalized such that a single reference coefficient associated with an antenna or CSI-RS port group (e.g., the reference antenna or CSI-RS port group) is one and not reported.

In some examples, the reference amplitude coefficients are normalized such that the two reference coefficients for both polarizations of a single antenna or CSI-RS port group are one and not reported.

As previously described, the method performed by the UE, in accordance with an embodiment, comprises, selecting one or more basis vectors from a reduced-size basis set comprising $$N_3'$$

basis vectors from the $N_3$-sized second basis set for all antenna or CSI-RS port groups of the precoder matrix, wherein $$N_3' < N_3,$$

and indicating the one or more selected basis vector(s) in the CSI report.

In accordance with embodiments, the method performed by the UE, in accordance with an embodiment, comprises selecting one or more basis vectors from a reduced-size basis set comprising $$N_3'$$

basis vectors from the $N_3$-sized second basis set for a number of antenna or CSI-RS port group(s) of the precoder matrix, wherein $$N_3' < N_3,$$

and indicating the one or more selected basis vector(s) or the index/indices associated with the one or more basis vector(s) for each antenna or CSI-RS port group of the precoder matrix in the CSI report.

In accordance with embodiments, the indices of the $$N_3'$$

basis vectors associated with an antenna or CSI-RS port group of the precoder matrix are from an antenna-group-specific basis index set comprising $$N_3'$$

consecutive indices, and the index/indices of the one or more selected basis vector(s) are from the antenna-group-specific basis index set.

In accordance with embodiments, the antenna-group-specific basis index set, $\mathcal{R}_g$, is defined by $$\mathcal{R}_g = \{\mathrm{mod}(k_g + 0, N_3), \mathrm{mod}(k_g + 1, N_3), \ldots , \mathrm{mod}(k_g + N_3' - 1, N_3)\},$$

wherein $k_g$ is a parameter indicating the first index of the antenna-group-specific basis set and mod (a,b) denotes the modulo function of a modulo b.

In accordance with embodiments, the parameter(s), $k_g$, representing the first index/indices of the antenna-group-specific basis set(s) are indicated in the CSI report.

In accordance with embodiments, the indices associated with the $$N_3'$$

basis vectors from the second basis set for each antenna port group or CSI-RS port group of the precoder matrix are represented by a common basis index set and a parameter indicating a relative shift of the indices of the common basis index set.

In accordance with embodiments, the parameter(s) indicating the relative shift(s) of the indices of the common basis index set for a number of antenna or CSI-RS port groups of the precoder matrix are indicated in the CSI report.

In accordance with embodiments, the index/indices associated with the one or more selected basis vector(s) are mapped to an index or a plurality of indices of the common basis set and indicated in the CSI report.

In accordance with embodiments, a mapping between the $$N_3'$$

consecutive indices of the common basis set $$\mathcal{B} = \{0, 1, \ldots N_3' - 1\}$$

and the $$N_3'$$

consecutive indices of the antenna-group-specific basis index set, $\mathcal{B}_g$, is defined in a modulo sense by $$\mathcal{R}_g = \{\mathrm{mod}(k_g+0, N_3), \mathrm{mod}(k_g+1, N_3), \ldots, \mathrm{mod}(k_g+N_3'-1, N_3)\},$$

wherein $k_g$ denotes the relative shift.

Figure 7:
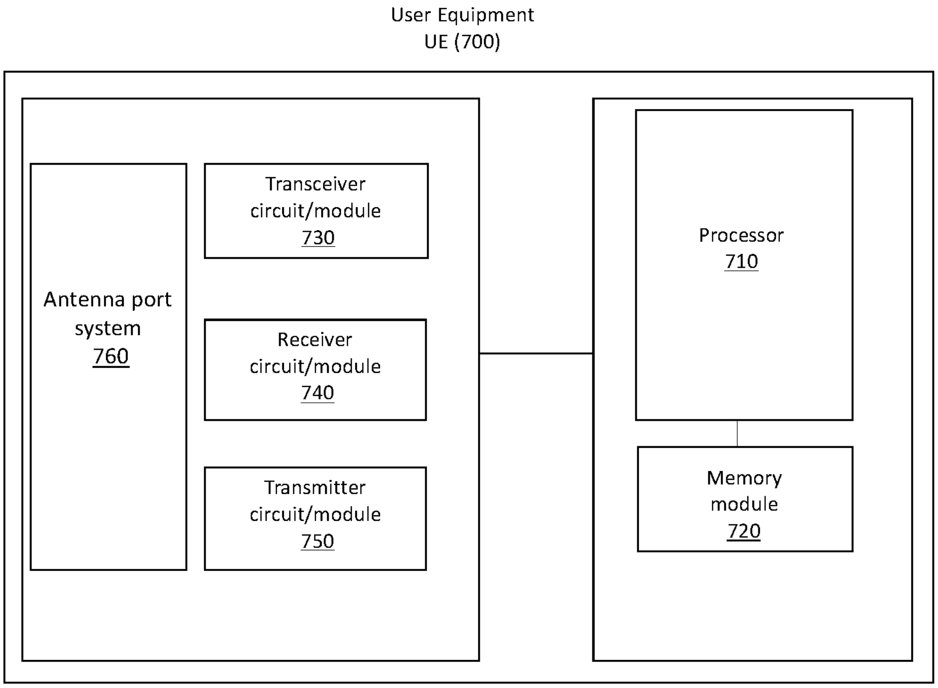
FIG. 7 is a block diagram depicting a UE according to some embodiments herein.

In order to perform the previously described process or method steps performed by the UE there is also provided a UE. FIG. 7 illustrates a block diagram depicting a UE 700. The UE 700 comprises a processor 710 or processing circuit or a processing module or a processor by means 710; a receiver circuit or receiver module 740; a transmitter circuit or transmitter module 750; a memory module 720, a transceiver circuit or transceiver module 730 which may include the transmitter circuit 750 and the receiver circuit 740. The UE 700 further comprises an antenna system 760 which includes antenna circuitry for transmitting and receiving signals to/from at least the network node. The antenna system employs beamforming as previously described.

As previously described, the UE 700 is configured to: receive from a network node a CSI report configuration indicating a number of antenna port groups or CSI-RS port groups, wherein each antenna or CSI-RS port group comprises at least one antenna or CSI-RS port. The UE 700 is further configured to determine based on the received CSI report configuration a precoder matrix for a number of antenna or CSI-RS port groups; the precoder matrix being based on a first basis set and a second basis set and a set of combining coefficients for complex scaling or combining one or more basis vectors selected from the first basis set and second basis set, wherein the basis vectors of the first basis set are associated with the antenna ports of the antenna or CSI-RS port groups of the precoder matrix and the basis vectors of the second basis set are associated the frequency domain units or subbands of the precoder matrix. The UE 700 is further configured to generate a CSI report comprising a PMI indicating the precoder matrix for the number of antenna port groups or CSI port groups, and the UE 700 is configured to transmit or report over an uplink channel the generated CSI report to the network node or gNB.

As previously described, the UE 700 is further configured to select one or more basis vectors from a reduced-size basis set comprising $$N_3'$$

basis vectors from the $N_3$-sized second basis set for all antenna port groups or CSI-RS port groups of the precoder matrix, wherein $$N_3' < N_3,$$

and the UE 700 is configured to indicate the one or more selected basis vector(s) in the CSI report.

According to another embodiment, the UE 700 is configured to select one or more basis vectors from a reduced-size basis set comprising $$N_3'$$

basis vectors from the $N_3$-sized second basis set for a number of antenna or CSI-RS port group(s) of the precoder matrix, wherein $$N_3' < N_3,$$

and the UE 700 is configured to indicate the one or more selected basis vector(s) or the index/indices associated with the one or more basis vector(s) for each antenna port group or CSI-RS port group of the precoder matrix in the CSI report.

Additional actions performed by the UE 700 have already been described and need not be repeated again.

The UE 700 may belong to any radio access technology including 4G or LTE, LTE-A, 5G, advanced 5G or a combination thereof that support beamforming technology. The UE comprising the processor and the memory contains instructions executable by the processor, whereby the UE 700 is operative or is configured to perform any one of the embodiments related to the UE previously described.

The processing module/circuit 710 includes a processor, microprocessor, an application specific integrated circuit (ASIC), field programmable gate array (FPGA), or the like, and may be referred to as the "processor." The processor 710 controls the operation of the network node and its components. Memory (circuit or module) 720 includes a random-access memory (RAM), a read only memory (ROM), and/or another type of memory to store data and instructions that may be used by processor 710. In general, it will be understood that the network node in one or more embodiments includes fixed or programmed circuitry that is configured to carry out the operations in any of the embodiments disclosed herein.

In at least one such example, the processor 710 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure relating to the UE. Further, it will be appreciated that the UE 700 may comprise additional components.

Figure 8:
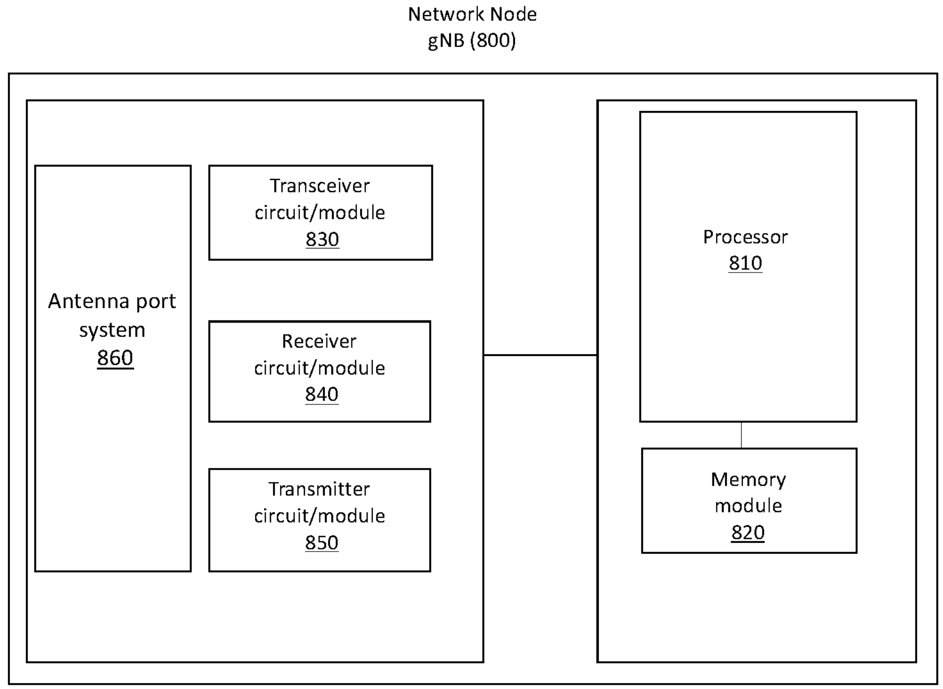
FIG. 8 is a block diagram depicting a network node according to some embodiments herein.

In order to perform the previously described process or method steps performed by the network node or gNB, there is also provided a network node (or gNB). FIG. 8 illustrates an exemplary block diagram of a network node 800. The network node 800 comprises a processor 810 or processing circuit or a processing module or a processor or means 810; a receiver circuit or receiver module 840; a transmitter circuit or transmitter module 850; a memory module 820, a transceiver circuit or transceiver module 830 which may include the transmitter circuit 850 and the receiver circuit 840. The network node 800 further comprises an antenna system 860 which includes antenna circuitry for transmitting and receiving signals to/from at least the UE. The antenna system 860 employs beamforming as previously described. The network node 800 may also be viewed as a Transmitter and Receiver Point (TRP).

The processing module/circuit 810 includes a processor, microprocessor, an application specific integrated circuit (ASIC), field programmable gate array (FPGA), or the like, and may be referred to as the "processor." The processor 810 controls the operation of the network node and its components. Memory (circuit or module) 820 includes a random-access memory (RAM), a read only memory (ROM), and/or another type of memory to store data and instructions that may be used by processor 810. In general, it will be understood that the network node in one or more embodiments includes fixed or programmed circuitry that is configured to carry out the operations in any of the embodiments disclosed herein.

In at least one such example, the processor 810 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node 800 may comprise additional components.

The network node 800 may belong to any radio access technology including 4G or LTE, LTE-A, 5G, advanced 5G or a combination thereof that support beamforming technology. The network node 800 comprising the processor and the memory contains instructions executable by the processor, whereby the network node 800 is operative or is configured to perform any one of the subject-matter presented in this disclosure related to the network node (or gNB).

As previously described, the network node 800 is configured to: transmit to the UE, a CSI report configuration information indicating a number of antenna port groups or CSI-RS port groups, wherein each antenna or CSI-RS port group comprises at least one antenna or CSI-RS port, for enabling the UE to determine based on the transmitted CSI report configuration a precoder matrix for a number of antenna or CSI-RS port groups; the precoder matrix being based on a first basis set and a second basis set and a set of combining coefficients for complex scaling or combining one or more basis vectors selected from the first basis set and second basis set, wherein the basis vectors of the first basis set are associated with the antenna ports of the antenna or CSI-RS port groups of the precoder matrix and the basis vectors of the second basis set are associated with the frequency domain units or subbands of the precoder matrix. The network node 800 is further configured to receive from the UE a CSI feedback report, generated by the UE. The CSI report or the CSI feedback report comprises a Precoder Matrix Indicator (PMI) indicating the precoder matrix for the number of antenna port groups or CSI-RS port groups.

Additional details on the functions and operations performed by the network node 800 have already been described and need not be repeated again.

Several advantages of the described embodiments in this disclosure are achieved as previously described and which include significantly reducing the feedback overhead and the computational complexity at the UE for codebook-based CSI reporting for joint transmission from a network node or gNB equipped with multiple RRHs or panels or antenna arrays to the UE, assuming information of angles and delays of multipath components of the channel is available at the base station or at the network node. Another advantage is to reduce latency in the CSI reporting.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including LTE or 4G, LTE-A (or LTE-Advanced), 5G, advanced 5G, WiMAX, WiFi, satellite communications, TV broadcasting etc.

The invention claimed is:

1. A method performed by a User Equipment (UE), the method comprising:

receiving from a network node (gNB), a Channel State Information (CSI) report configuration indicating a number of antenna port groups or Channel State Information-Reference Signal (CSI-RS) port groups, wherein each antenna or CSI-RS port group comprises at least one antenna or CSI-RS port;

determining based on the CSI report configuration, a precoder matrix for a number of antenna or CSI-RS port groups, the precoder matrix being based on a first basis set and a second basis set and a set of combining coefficients for complex scaling or combining one or more basis vectors selected from the first basis set and second basis set, wherein the first basis set comprises multiple first basis sets and each first basis set is associated with an antenna or CSI-RS port group, and wherein a basis vector of a first basis set is of size $N_1N_2\times1$ and wherein $N_1$ and $N_2$ denote the number of antenna ports for a first dimension and a second dimension of an antenna or CSI-RS port group, and wherein the basis vectors of the first basis set are associated with the antenna ports of the antenna or CSI-RS port groups of the precoder matrix and the basis vectors of the second basis set are associated with frequency domain units or subbands of the precoder matrix;

for each antenna or CSI-RS port group of the number of antenna or CSI-RS port groups of the precoder matrix, selecting one or more basis vectors from a reduced-size basis set comprising $$N_3'$$

basis vectors from a $N_3$-sized second basis set, where $$N_3' < N_3,$$

wherein for each antenna or CSI-RS port group of the number of antenna or CSI-RS port groups of the precoder matrix, indices associated with the $$N_3'$$

basis vectors from the second basis set are represented by a common basis index set that is common for the number of antenna or CSI-RS port groups, and a parameter indicating a relative shift of indices of the common basis index set;

generating a CSI report comprising a Precoder Matrix Indicator (PMI) indicating the precoder matrix for the number of antenna or CSI-RS port groups, wherein, for each of the number of antenna or CSI-RS port groups of the precoder matrix that is not a reference antenna or a reference CSI-RS port group, the parameter indicating the relative shift of the indices of the common basis index set is selected by the UE and indicated in the CSI report; and reporting, to the network node or gNB, the CSI report.

2. The method according to claim 1, wherein the reduced-size basis set is an antenna-group-specific basis set.

3. The method according to claim 1, further comprising indicating the one or more selected basis vectors associated with the one or more basis vectors for each antenna or CSI-RS port group of the number of antenna or CSI-RS port groups of the precoder matrix in the CSI report.

4. The method according to claim 1, wherein the parameter indicating the relative shift of the indices of the common basis index set for each of the number of antenna or CSI-RS port groups of the precoder matrix is selected from $\{0, \ldots, N_3-1\}$.

5. The method according to claim 1, wherein a parameter indicating a relative shift associated with a reference antenna or CSI-RS port group of the precoder matrix is fixed and known to the network node, and hence not indicated in the CSI report.

6. The method according to claim 5, wherein the reference antenna or CSI-RS port group is a first antenna or CSI-RS port group of the precoder matrix.

7. The method according to claim 1, wherein $L_v$ basis vectors from the first basis set are selected per antenna or CSI-RS port group for a number of antenna or CSI-RS port groups of the precoder matrix.

8. The method according to claim 7, wherein parameter $L_v$ is different for a number of antenna or CSI-RS port groups of the precoder matrix.

9. The method according to claim 7, wherein parameter $L_v$ is configured to the UE.

10. The method according to claim 7, wherein parameter $L_v$ is reported by the UE.

11. The method according to claim 1, further comprising a first indicator in the CSI report indicating the Ng basis vectors from the second basis set across all antenna or CSI-RS port groups of the precoder matrix, wherein $N_3'<N_3$.

12. The method according to claim 11, wherein the first indicator is a combinatorial bit indicator $$\left\lceil \log_2\binom{N_3-1}{N_3'-1}\right\rceil,$$

wherein $$N_3'$$

denotes the number of selected basis vectors across all antenna or CSI-RS port groups of the precoder matrix, and $N_3$ denotes the total number of basis vectors of the second basis set.

13. The method according to claim 11, wherein a subset of the selected basis vectors indicated by the first indicator and associated with each of $L_v$ selected basis vectors from the first basis set is selected and indicated in the CSI report.

14. The method according to claim 13, wherein a second indicator is a bitmap of size $$N_3'L_v\times 1,$$

wherein each bit in the bitmap is associated with a basis vector indicated by the first indicator and a selected basis vector from the first basis set.

15. A User Equipment (UE) comprising a processor and a memory containing instructions executable by the processor, whereby the UE is configured to:

receive from a network node (gNB), a CSI report configuration indicating a number of antenna port groups or Channel State Information-Reference Signal (CSI-RS) port groups, wherein each antenna or CSI-RS port group comprises at least one antenna or CSI-RS port;

determine based on the CSI report configuration, a precoder matrix for a number of antenna or CSI-RS port groups, the precoder matrix being based on a first basis set and a second basis set and a set of combining coefficients for complex scaling or combining one or more basis vectors selected from the first basis set and second basis set, wherein the first basis set comprises multiple first basis sets and each first basis set is associated with an antenna or CSI-RS port group, and wherein a basis vector of a first basis set is of size $N_1N_2\times 1$ and wherein $N_1$ and $N_2$ denote the number of antenna ports for a first dimension and a second dimension of an antenna or CSI-RS port group, and wherein the basis vectors of the first basis set are associated with the antenna ports of the antenna or CSI-RS port groups of the precoder matrix and the basis vectors of the second basis set are associated with frequency domain units or subbands of the precoder matrix;

for each antenna or CSI-RS port group of the number of antenna or CSI-RS port groups of the precoder matrix, select one or more basis vectors from a reduced-size basis set comprising $$N_3'$$

basis vectors from a $N_3$-sized second basis set, where $$N_3' < N_3,$$

wherein for each antenna or CSI-RS port group of the number of antenna or CSI-RS port groups of the precoder matrix, indices associated with the $$N_3'$$

basis vectors from the second basis set are represented by a common basis index set that is common for the number of antenna or CSI-RS port groups, and a parameter indicating a relative shift of indices of the common basis index set;

generate a CSI report comprising a Precoder Matrix Indicator (PMI) indicating the precoder matrix for the number of antenna or CSI-RS port groups, wherein, for each of the number of antenna or CSI-RS port groups of the precoder matrix, the parameter indicating the relative shift of the indices of the common basis index set is selected by the UE and indicated in the CSI report; and report, to the network node or gNB, the CSI report.

16. A method performed by a network node, the method comprising:

transmitting to a User Equipment (UE), a Channel State Information (CSI) report configuration information indicating a number of antenna port groups or Channel State Information-Reference Signal (CSI-RS) port groups, wherein each antenna or CSI-RS port group comprises at least one antenna or CSI-RS port, for enabling the UE to determine based on the transmitted CSI report configuration a precoder matrix for a number of antenna or CSI-RS port groups, the precoder matrix being based on a first basis set and a second basis set and a set of combining coefficients for complex scaling or combining one or more basis vectors selected from the first basis set and second basis set, wherein the first basis set comprises multiple first basis sets and each first basis set is associated with an antenna or CSI-RS port group, and wherein a basis vector of a first basis set is of size $N_1N_2\times1$ and wherein $N_1$ and $N_2$ denote the number of antenna ports for a first dimension and a second dimension of an antenna or CSI-RS port group, and wherein the basis vectors of the first basis set are associated with the antenna ports of the antenna or CSI-RS port groups of the precoder matrix and the basis vectors of the second basis set are associated with frequency domain units or subbands of the precoder matrix, wherein for each antenna or CSI-RS port group of the number of antenna or CSI-RS port groups of the precoder matrix, one or more basis vectors are selected from a reduced-size basis set comprising $$N_3'$$

basis vectors from a $N_3$-sized second basis set, where $$N_3' < N_3,$$

and wherein for each antenna or CSI-RS port group of the number of antenna or CSI-RS port groups of the precoder matrix, indices associated with the $$N_3'$$

basis vectors from the second basis set are represented by a common basis index set that is common for the number of antenna or CSI-RS port groups, and a parameter indicating a relative shift of indices of the common basis index set; and receiving, from the UE, a CSI report, generated by the UE, wherein the CSI report comprises a Precoder Matrix Indicator (PMI), indicating the precoder matrix for the number of antenna or CSI-RS port groups, wherein, for each of the number of antenna or CSI-RS port groups of the precoder matrix, the parameter indicating the relative shift of the indices of the common basis index set is selected by the UE and indicated in the CSI report.

17. A network node comprising a processor and a memory containing instructions executable by the processor, whereby said network node is configured to:

transmit to a User Equipment (UE), a Channel State Information (CSI) report configuration information indicating a number of antenna port groups or Channel State Information-Reference Signal (CSI-RS), port groups, wherein each antenna or CSI-RS port group comprises at least one antenna or CSI-RS port, for enabling the UE to determine based on the transmitted CSI report configuration a precoder matrix for a number of antenna or CSI-RS port groups, the precoder matrix being based on a first basis set and a second basis set and a set of combining coefficients for complex scaling or combining one or more basis vectors selected from the first basis set and second basis set, wherein the first basis set comprises multiple first basis sets and each first basis set is associated with an antenna or CSI-RS port group, and wherein a basis vector of a first basis set is of size $N_1N_2\times1$ and wherein $N_1$ and $N_2$ denote the number of antenna ports for a first dimension and a second dimension of an antenna or CSI-RS port group, wherein the basis vectors of the first basis set are associated with the antenna ports of the antenna or CSI-RS port groups of the precoder matrix and the basis vectors of the second basis set are associated with frequency domain units or subbands of the precoder matrix, wherein for each antenna or CSI-RS port group of the number of antenna or CSI-RS port groups of the precoder matrix, one or more basis vectors are selected from a reduced-size basis set comprising $$N_3'$$

basis vectors from a $N_3$-sized second basis set, where $$N_3' < N_3,$$

and wherein for each antenna or CSI-RS port group of the number of antenna or CSI-RS port groups of the precoder matrix, indices associated with the $$N_3'$$

basis vectors from the second basis set are represented by a common basis index set that is common for the number of antenna or CSI-RS port groups, and a parameter indicating a relative shift of indices of the common basis index set; and receive, from the UE, a CSI report, generated by the UE, wherein the CSI report comprises a Precoder Matrix Indicator (PMI), indicating the precoder matrix for the number of antenna or CSI-RS port groups, wherein, for each of the number of antenna or CSI-RS port groups of the precoder matrix, the parameter indicating the relative shift of the indices of the common basis index set is selected by the UE and indicated in the CSI report.

* * * * *